(12) United States Patent
Kahtava et al.

(10) Patent No.: US 10,491,347 B2
(45) Date of Patent: Nov. 26, 2019

(54) COMMUNICATION DEVICE FOR LTE COMMUNICATION WITHIN UNUSED GSM CHANNELS

(71) Applicant: SONY CORPORATION, Tokyo (JP)

(72) Inventors: Jussi Kahtava, Basingstoke (GB); Matthew William Webb, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 3 days.

(21) Appl. No.: 15/122,838

(22) PCT Filed: Mar. 2, 2015

(86) PCT No.: PCT/EP2015/054256
§ 371 (c)(1),
(2) Date: Aug. 31, 2016

(87) PCT Pub. No.: WO2015/135780
PCT Pub. Date: Sep. 17, 2015

(65) Prior Publication Data
US 2017/0070324 A1    Mar. 9, 2017

(30) Foreign Application Priority Data
Mar. 11, 2014  (EP) .................................... 14158990

(51) Int. Cl.
*H04W 4/00* (2018.01)
*H04L 5/00* (2006.01)
(Continued)

(52) U.S. Cl.
CPC ........ *H04L 5/0044* (2013.01); *H04L 27/0006* (2013.01); *H04W 16/14* (2013.01); *H04W 88/06* (2013.01); *H04W 88/08* (2013.01)

(58) Field of Classification Search
None
See application file for complete search history.

(56) References Cited

U.S. PATENT DOCUMENTS

2012/0243513 A1* 9/2012 Fujishima ........... H04W 72/085
                                                                370/336
2013/0039296 A1  2/2013 Damnjanovic
(Continued)

OTHER PUBLICATIONS

International Search Report dated May 15, 2015, in PCT/EP2015/0054256 filed Mar. 2, 2015.
(Continued)

*Primary Examiner* — Zewdu A Beyen
(74) *Attorney, Agent, or Firm* — Xsensus LLP

(57) ABSTRACT

A communications device for communicating data, the communications device including a receiver for receiving signals representing downlink data from a network element of a wireless telecommunications system via a wireless access interface having a logical baseband frame structure, a transmitter for transmitting signals representing uplink data to the network element via the wireless access interface, the logical baseband frame structure being formed from one or more minimum frequency units and one or more time units to form communications resources for allocation by the network element to the communications device, and a controller for controlling the transmitter and the receiver to transmit and to receive signals representing the data to and from the network element using the wireless access interface. The controller is configured in combination with the transmitter and the receiver to receive an indication of frequency resources within a host frequency band.

18 Claims, 20 Drawing Sheets

(51) Int. Cl.
*H04L 27/00* (2006.01)
*H04W 16/14* (2009.01)
*H04W 88/06* (2009.01)
*H04W 88/08* (2009.01)

(56) References Cited

U.S. PATENT DOCUMENTS

2013/0301609 A1* 11/2013 Smith .............. H04W 72/0493
  370/331
2013/0308595 A1  11/2013 Ratasuk

OTHER PUBLICATIONS

I. Strykhalyuk et al., "Spectrum sharing in infrastructure based Cognitive Radio networks", Joint Conference Computational Problems of Electrical Engineering and Advanced Methods of the Theory of Electrical Engineering, (Sep. 4, 2013), XP055186435, 1 page. (11-8).
H. Holma et al., "LTE for UMTS OFDMA and SC-FDMA Based Radio Access", Wiley, (2009), ISBN 978-0-470-99401-6, (pp. 25-27) 4 pages.

* cited by examiner

COMMUNICATION DEVICE FOR LTE COMMUNICATION WITHIN UNUSED GSM CHANNELS

The present application claims priority to European Patent Application 14 158 990.3, filed in the European Patent Office on Mar. 11, 2014, the entire contents of which being incorporated herein by reference.

FIELD OF THE DISCLOSURE

The present disclosure relates to communications devices, communications systems for communicating data and methods of communicating data.

BACKGROUND OF THE DISCLOSURE

Mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as video streaming and video conferencing on mobile communications devices that would previously only have been available via a fixed line data connection.

The demand to deploy fourth generation networks is therefore strong and the coverage area of these networks, i.e. geographic locations where access to the networks is possible, is expected to increase rapidly. However, although the coverage and capacity of fourth generation networks is expected to significantly exceed those of previous generations of communications networks, there are still limitations on network capacity and the geographical areas that can be served by such networks. These limitations may, for example, be particularly relevant in situations in which networks are experiencing high load.

Consequently, there is a demand to deploy fourth generation networks in resources conventionally allocated to preceding mobile communications system such as GSM mobile communications systems. However, although the network operators wish to increase the deployment of fourth generation networks, they also wish to maintain the presence of GSM networks for voice services and low-cost low data rate communications for example. In order to address these conflicting requirements it is envisaged that portions of resources conventionally allocated GSM systems and the like may be used for the deployment of fourth generation network.

SUMMARY OF THE DISCLOSURE

According to a first example of the present disclosure there is provided a communications device for communicating data, the communications device comprising a receiver for receiving signals representing downlink data from a network element of a wireless telecommunications system via a wireless access interface having a logical baseband frame structure and a transmitter for transmitting signals representing uplink data to the network element via the wireless access interface. The logical baseband frame structure is formed from one or more minimum frequency units and one or more time units to form communications resources for allocation by the network element to the communications device. A controller controls the transmitter and the receiver to transmit and to receive signals representing the data to and from the network element using the wireless access interface. The controller is configured in combination with the transmitter and the receiver to receive an indication of one or more frequency resources which are available within a host frequency band, to combine the one or more frequency resources within the host frequency band in time and/or frequency to form the one or more of the minimum frequency units of the logical baseband frame structure, and to transmit or to receive the signals representing the data to or from the network element using the communications resources provided by the one or more minimum frequency units formed within the host frequency band.

According to another example of the present disclosure the host band includes one or more unoccupied GSM channels and each of the one or more minimum frequency units of the second band are positioned in a one of the unoccupied GSM channels.

Conventional OFDM based communications systems such as LTE are provided over contiguous portions of frequency, where in LTE bandwidths of approximately 1.08 MHz or greater are used for the provision of LTE carriers. However, this limits the deployment of LTE to contiguous frequency resources. The present technique enables the transmission and reception of LTE signals using a plurality of fragmented communications resources which may be separated in time and or frequency and combined to form an LTE carrier. These resources are formed from subcarriers which are positioned in non-contiguous portions of frequency spectrum where minimum frequency units are formed form 12 subcarriers for example. Prior to transmission and reception using the communications resource of the second band, the signals representing the relevant data are divided and aggregated respectively between the communication resources of the second band. Consequently, transmissions using the fragmented resources appear to be conventional LTE transmissions prior to and after division and aggregation/combination of the transmission signals respectively. By virtue of this division and aggregation, LTE carriers may effectively be formed from combining frequency resources over time and or frequency and therefore their scope for deployment increased. The ability to provides LTE carriers in non-contiguous frequency resources allows LTE carriers to be provided in unoccupied GSM channels which are narrower in bandwidth that the minimum LTE carrier bandwidth. In turn this therefore provides mobile network operators with the ability to repurpose GSM channels for use in LTE networks without having to repurpose large contiguous portions of GSM frequency allocations to LTE networks. The use of resources of minimum frequency units which are separated in both time and frequency effectively provides both time and frequency diversity in the transmission and reception of the signals conveyed using the resources. This may therefore increase robustness to burst errors and or time and frequency dependent fading.

According to another example of the present disclosure a plurality of the one or more sub-carriers of at least one of the minimum frequency units within the host frequency band are combined for a single time unit to form the communications resources corresponding to the one or more minimum frequency units.

The combining of resources across a plurality of minimum frequency units over a single time unit provides an increased data rate for a communications device compared to transmissions combining over a plurality of time units. This will therefore provide a communications system which has an improved latency and maximum data rate for individual communications devices.

According to another example of the present disclosure a plurality of the one or more sub-carriers of at least one of the minimum frequency units in the host frequency band are combined for a plurality of time units to form the communications resources corresponding to the one or more minimum frequency units.

The combining of resources over time allows a receiver and transmitter to receive and transmit over a reduced number or only a single frequency. This may therefore reduce the complexity of the front end of the transmitter and receiver by reducing the need for extended FFTs and IFFTs or multiple parallel FFTs/IFFTs which cover multiple minimum frequency units that are not contiguous in frequency unit. The combining of resources over time may also be referred to as time dilation.

According to another example of the present disclosure the signals representing uplink data are transmitted and received in accordance with SC-FDMA.

According to another example of the present disclosure the signals representing downlink data are transmitted and received in accordance with OFDM.

According to another example of the present disclosure controller is configured in combination with the receiver to receive an indication from the network element of the one or more minimum frequency resources within the second frequency band.

Upon entry into a coverage area of a network element, a communications device may not be aware of the provision of a subcarriers and therefore resources in the second frequency band. By virtue of the serving network element providing an indication to the communications devices of the presence subcarriers that form minimum frequency units in the second band, communications devices may not be required to perform a search of candidate frequencies in order to establish the location of subcarriers whose resources may be combined. This therefore reduces the demands placed upon the communications device in terms of complexity.

Various further aspects and embodiments of the disclosure are provided in the appended claims, including but not limited to a communications system and methods of communicating data.

BRIEF DESCRIPTION OF THE DRAWINGS

Embodiments of the present disclosure will now be described by way of example only with reference to the accompanying drawing in which like parts are provided with corresponding reference numerals and in which.

DETAILED DESCRIPTION OF EXAMPLE EMBODIMENTS

Conventional LTE Communications System

Figure 1:
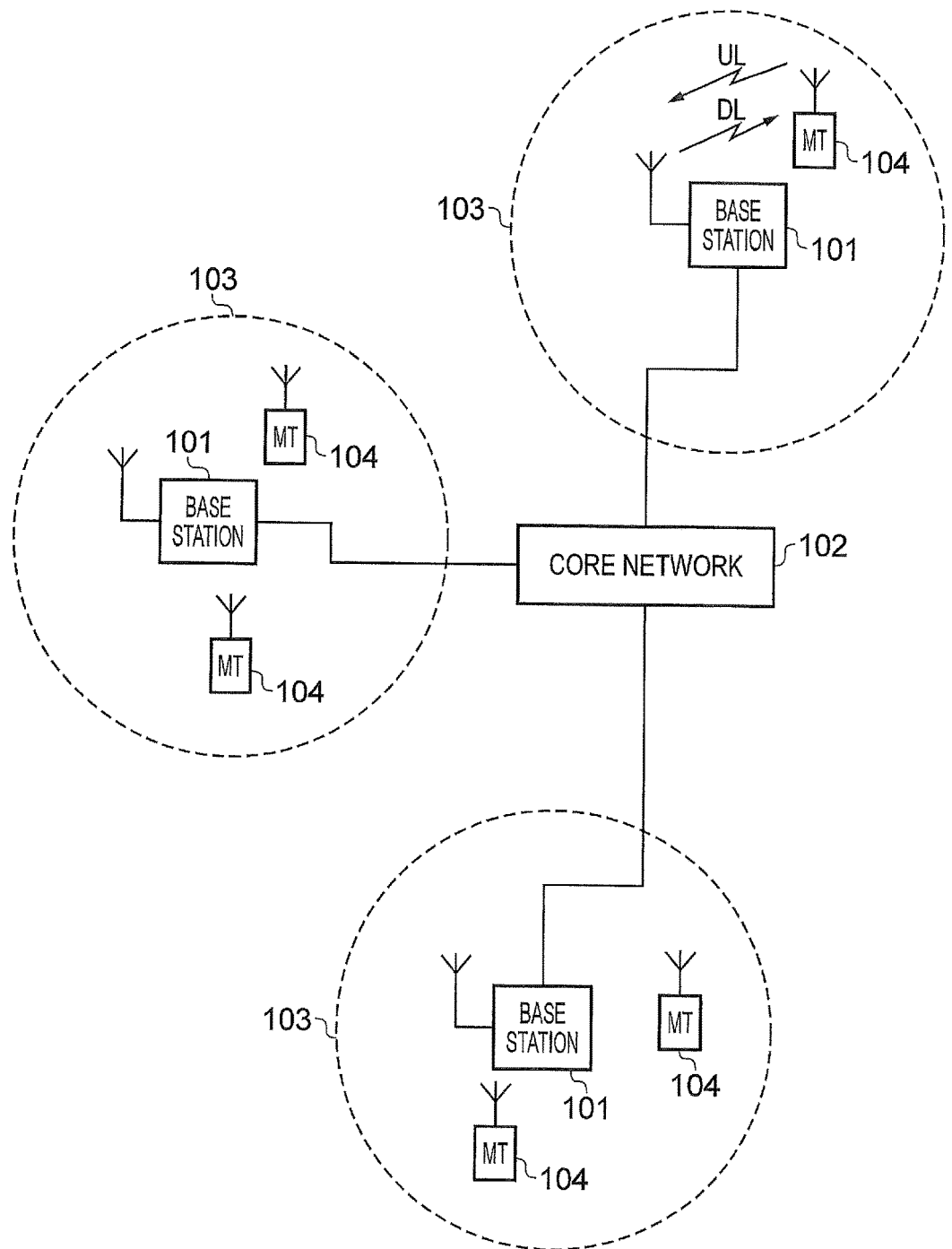
FIG. 1 provides a schematic diagram illustrating an example of a conventional mobile telecommunications network.

FIG. 1 provides a schematic diagram illustrating some basic functionality of a conventional mobile telecommunications network, using for example a 3GPP defined UMTS and/or Long Term Evolution (LTE) architecture.

The network includes a plurality of base stations 101 connected to a core network 102, where the base stations may also be referred to as infrastructure equipment, network elements, network entities, enhanced node Bs (eNodeB) or coordinating entities for example. Each base station provides a coverage area 103 (i.e. a cell) within which data can be communicated to and from communications devices (also referred to as user terminals, mobile terminals, MT, User equipment, UE and so forth) 104 by transmitting and receiving signals representing data across a wireless access interface which is provided or associated with the serving base station. Data is transmitted from base stations 101 to communications devices 104 within their respective coverage areas 103 via a radio downlink. Data is transmitted from communications devices 104 to the base stations 101 via a radio uplink. The core network 102 routes data to and from the terminal devices 104 via the respective base stations 101 and provides functions such as authentication, mobility management, charging and so on.

Mobile communications systems such as those arranged in accordance with the 3GPP defined Long Term Evolution (LTE) architecture use an orthogonal frequency division multiplexing (OFDM) based interface for the radio downlink (so-called OFDMA) and a single carrier frequency division multiple access based interface for the radio uplink (so-called SC-FDMA).

In LTE systems the wireless access interface of the downlink from an eNodeB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on the plurality of orthogonal subcarriers, where bandwidths between 1.25 MHZ and 20 MHz bandwidth may be divided into 128 to 2048 orthogonal subcarriers for example with between approximately 72 and 1200 of the subcarriers being occupied and used for data transmission and the remaining subcarriers acting as guard subcarriers. Each occupied subcarrier bandwidth may take any value but in LTE it is fixed at 15 kHz. The resources of the wireless access interface are also temporally divided into frames where a frame last 10 ms and is subdivided into 10 subframes each with a duration of 1 ms. Each subframe is formed from 14 or 16 OFDM symbols and is divided into two slots each of which comprise six or seven OFDM symbols depending on whether a normal or extended cyclic prefix is being utilised between OFDM symbols for the reduction of intersymbol interference.

Figure 2:
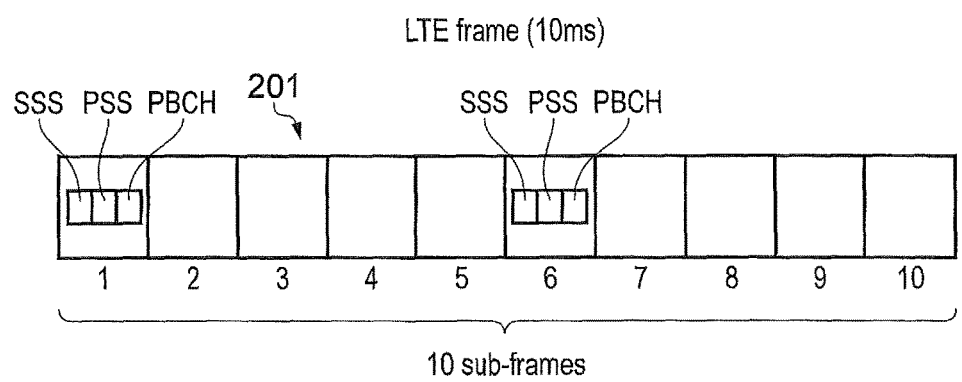
FIG. 2 provides a schematic diagram illustrating a conventional LTE radio frame.

FIG. 2 shows a schematic diagram illustrating an OFDM based LTE downlink radio frame 201. A primary synchronisation signal (PSS) and a secondary synchronisation signal (SSS) are transmitted in the first and sixth sub-frames of the LTE radio frame, in frequency division duplex (FDD). A physical broadcast channel (PBCH) is transmitted in the first sub-frame of the LTE radio frame. The PSS, SSS and PBCH are discussed in more detail below.

Figure 3:
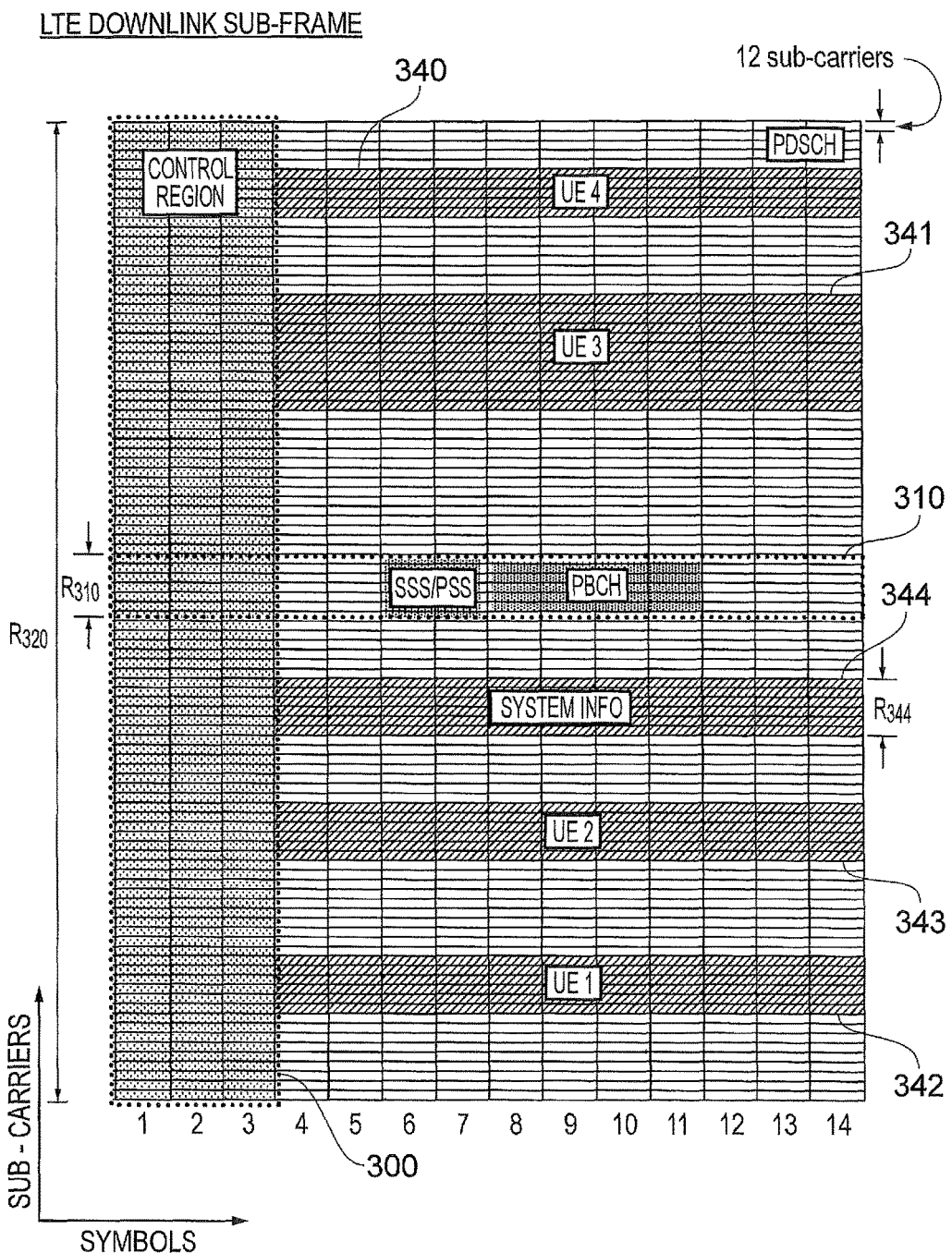
FIG. 3 provides a schematic diagram illustrating an example of a conventional LTE downlink radio subframe.

FIG. 3 is a schematic diagram of a grid which illustrates the structure of an example conventional downlink LTE sub-frame, which may also be referred to as a time unit or logical baseband frame structure for example. The sub-frame comprises a predetermined number of "OFDM symbols", which are each transmitted over a respective 1/14 ms period for example. Each symbol comprises a predetermined number of orthogonal sub-carriers distributed across the bandwidth of the downlink radio carrier. Here, the horizontal axis represents time while the vertical represents frequency.

The example sub-frame shown in FIG. 3 comprises 14 OFDM symbols and 1200 sub-carriers spread across a 20 MHz bandwidth, $R_{320}$. The smallest allocation of user data for transmission in LTE is a "physical resource block" (PRB) also termed a "resource block" comprising twelve sub-carriers transmitted over one slot (0.5 sub-frame). Each individual box in the sub-frame grid in FIG. 3 corresponds to twelve sub-carriers transmitted on one symbol. The resources blocks may also be further divided into resource elements which span one subcarrier for one OFDM symbol.

FIG. 3 shows in hatching resource allocations for four LTE terminals 340, 341, 342, 343. For example, the resource allocation 342 for a first LTE terminal (UE 1) extends over five blocks of twelve sub-carriers (i.e. 60 sub-carriers), the resource allocation 343 for a second LTE terminal (UE2) extends over six blocks of twelve sub-carriers and so on.

Control channel data is transmitted in a control region 300 (indicated by dotted-shading in FIG. 3) of the sub-frame comprising the first n symbols of the sub-frame where n can vary between one and three symbols for channel bandwidths of 3 MHz or greater and where n can vary between two and four symbols for channel bandwidths of 1.4 MHz. For the sake of providing a concrete example, the following description relates to host carriers with a channel bandwidth of 3 MHz or greater so the maximum value of n will be 3. The data transmitted in the control region 300 includes data transmitted on the physical downlink control channel (PD-CCH), the physical control format indicator channel (PC-FICH) and the physical HARQ indicator channel (PHICH).

PDCCH contains control data indicating which sub-carriers on which symbols of the sub-frame have been allocated to specific LTE terminals. Thus, the PDCCH data transmitted in the control region 300 of the sub-frame shown in FIG. 3 would indicate that UE1 has been allocated the block of resources identified by reference numeral 342, that UE2 has been allocated the block of resources identified by reference numeral 343, and so on.

PCFICH contains control data indicating the size of the control region (typically between one and three symbols, but four symbols being contemplated to support 1.4 MHz channel bandwidth).

PHICH contains HARQ (Hybrid Automatic Request) data indicating whether or not previously transmitted uplink data has been successfully received by the network. Symbols in the central band 310 of the time-frequency resource grid are used for the transmission of information including the primary synchronisation signal (PSS), the secondary synchronisation signal (SSS) and the physical broadcast channel (PBCH). This central band 310 is typically 72 sub-carriers wide (corresponding to a transmission bandwidth of 1.08 MHz). The PSS and SSS are synchronisation signals that once detected allow an LTE terminal device to achieve frame synchronisation and determine the cell identity of the eNodeB 101 transmitting the downlink signal. The PBCH carries information about the cell, comprising a master information block (MIB) that includes parameters that LTE terminals use to properly access the cell. Data transmitted to individual LTE terminals on the physical downlink shared channel (PDSCH) can be transmitted in other resource elements of the sub-frame. Further explanation of these channels is provided below.

FIG. 3 also shows a region of PDSCH 344 containing system information and extending over a bandwidth of $R_{344}$. A conventional LTE frame will also include reference signals which are discussed further below but not shown in FIG. 3 in the interests of clarity.

The number of sub-carriers in an LTE channel can vary depending on the configuration of the transmission network. Typically this variation is from 72 sub carriers contained within a 1.4 MHz channel bandwidth to 1200 sub-carriers contained within a 20 MHz channel bandwidth (as schematically shown in FIG. 3). As is known in the art, data transmitted on the PDCCH, PCFICH and PHICH is typically distributed on the sub-carriers across the entire bandwidth of the sub-frame to provide for frequency diversity. Therefore a conventional LTE communications device must be able to receive the entire channel bandwidth in order to receive and decode the control region. Further information on the structure and functioning of the physical channels of LTE systems can be found in [1].

Figure 4:
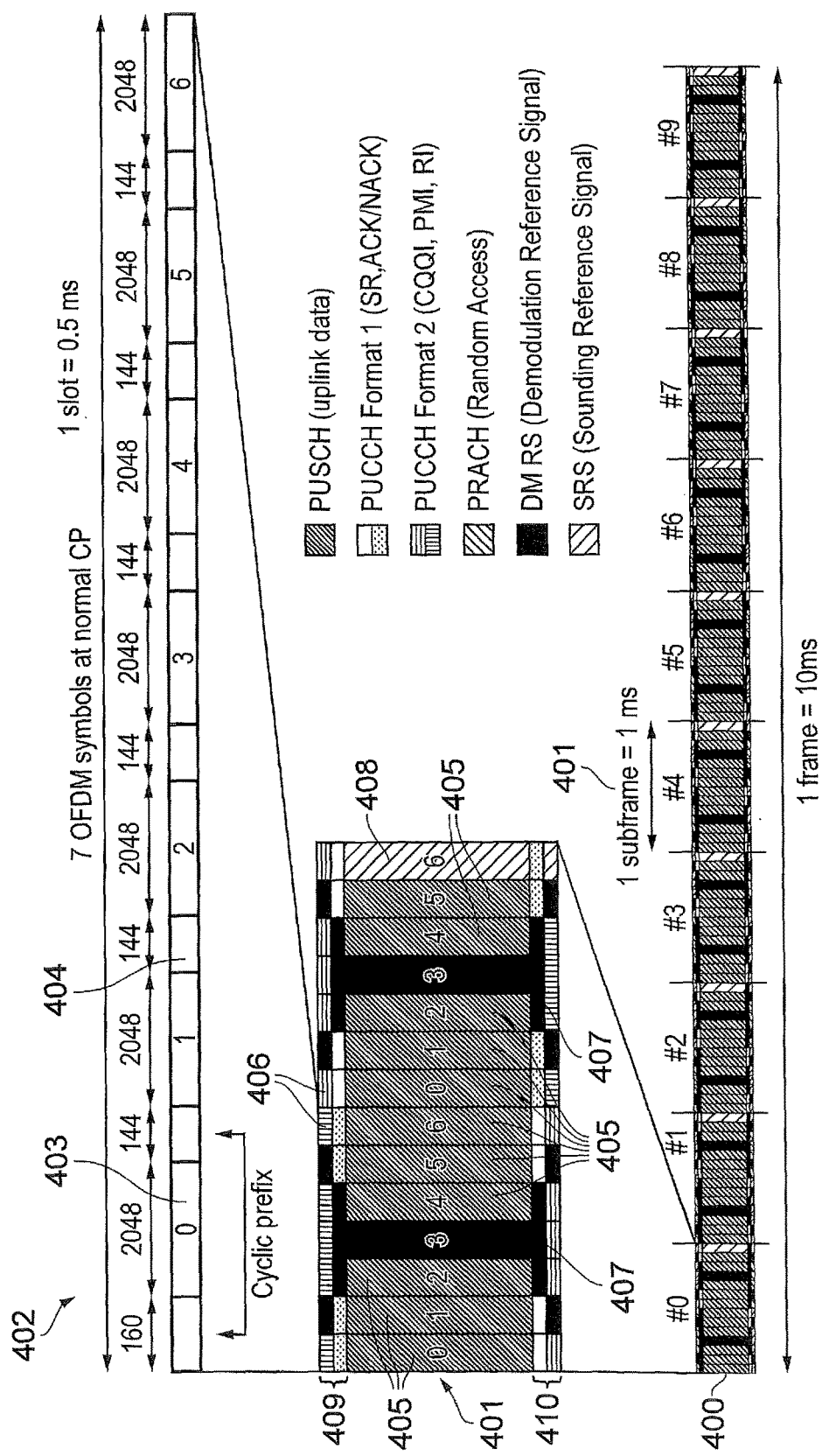
FIG. 4 provides a schematic diagram illustrating an example of conventional LTE uplink subframes.

FIG. 4 provides a simplified schematic diagram of the structure of an uplink of an LTE wireless access interface that may be provided by or in association with the eNodeB of FIG. 1. The uplink structure of the LTE wireless access interface may also be referred to as a time unit or logical baseband frame structure for example in an analogous manner to the downlink. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations subframes switch between uplink and downlink subframes in accordance with predefined patterns. However, regardless of the form of duplexing used, a common uplink frame structure is utilised. The simplified structure of FIG. 3 illustrates such an uplink frame in an FDD implementation. A frame 400 is divided in to 10 subframes 401 of 1 ms duration where each subframe 401 comprises two slots 402 of 0.5 ms duration. Each slot is then formed from seven OFDM symbols 403 where a cyclic prefix 404 is inserted between each symbol in a manner equivalent to that in downlink subframes. In FIG. 3 a normal cyclic prefix is used and therefore there are seven OFDM symbols within a subframe, however, if an extended cyclic prefix were to be used, each slot would contain only six OFDM symbols. The resources of the uplink subframes are also divided into resource blocks and resource elements in a similar manner to downlink subframes.

Each uplink subframe may include a plurality of different channels, for example a physical uplink shared channel (PUSCH) 405, a physical uplink control channel (PUCCH) 406, and a physical random access channel (PRACH). The physical Uplink Control Channel (PUCCH) may carry control information such as ACK/NACK to the eNodeB for downlink transmissions, scheduling request indicators (SRI) for UEs wishing to be scheduled uplink resources, and feedback of downlink channel state information (CSI) for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be used for UE connection initiation and may be scheduled in any of the resources of an uplink frame in accordance with a one of a plurality of PRACH patterns that may be signalled to UE in downlink signalling such as system information blocks. As well physical uplink channels, uplink subframes may also include reference signals. For example, demodulation reference signals (DMRS) 407 and sounding reference signals (SRS) 408 may be present in an uplink subframe, where the DMRS occupy the fourth symbol of a slot in which PUSCH is transmitted and are used for decoding of PUCCH and PUSCH data, and where SRS are used for uplink channel estimation at the eNodeB. Further information on the structure and functioning of the physical channels of LTE systems can be found in [1].

In an analogous manner to the resources of the PDSCH, resources of the PUSCH are required to be scheduled or granted by the serving eNodeB. Therefore if data is to be transmitted by a UE, resources of the PUSCH are required to be granted to the UE by the eNodeB, where uplink grants may for example be indicated to a UE via DCI conveyed by the PDDCH. Uplink resources may be granted by an eNodeB in a number of circumstances, for example a grant may be provided in response to a UE transmitting a scheduling request or a buffer status report to its serving eNodeB.

Although similar in structure to downlink subframes, uplink subframes have a different control structure, in particular the upper 409 and lower 410 subcarriers/frequencies/resource blocks of an uplink subframe are reserved for control signalling rather than the initial symbols of a downlink subframe. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocations are contiguous. However, in SC-FDM subcarriers are modulated in combination and therefore if efficient use of the available resources are to be made contiguous frequency allocations for each UE are preferable.

LTE and GSM Frequency Allocation

In GSM systems, carriers or channels are of a fixed bandwidth of 200 kHz where allocated frequency ranges are divided into one or more 200 kHz carriers. Frequency ranges are also divided into uplink and downlink bandwidths for frequency division duplex operation. Each carrier within the uplink and downlink is divided into eight timeslots in accordance with a time division multiple access technique, where each communicating UE is allocated a time slot in each of the uplink and downlink bandwidths. A plurality of frequency ranges are defined for GSM systems, where for example in the UK three common GSM bands are GSM900, E-GSM900 and GSM 1800. However, in other countries different GSM frequency ranges may be used.

Figure 5:
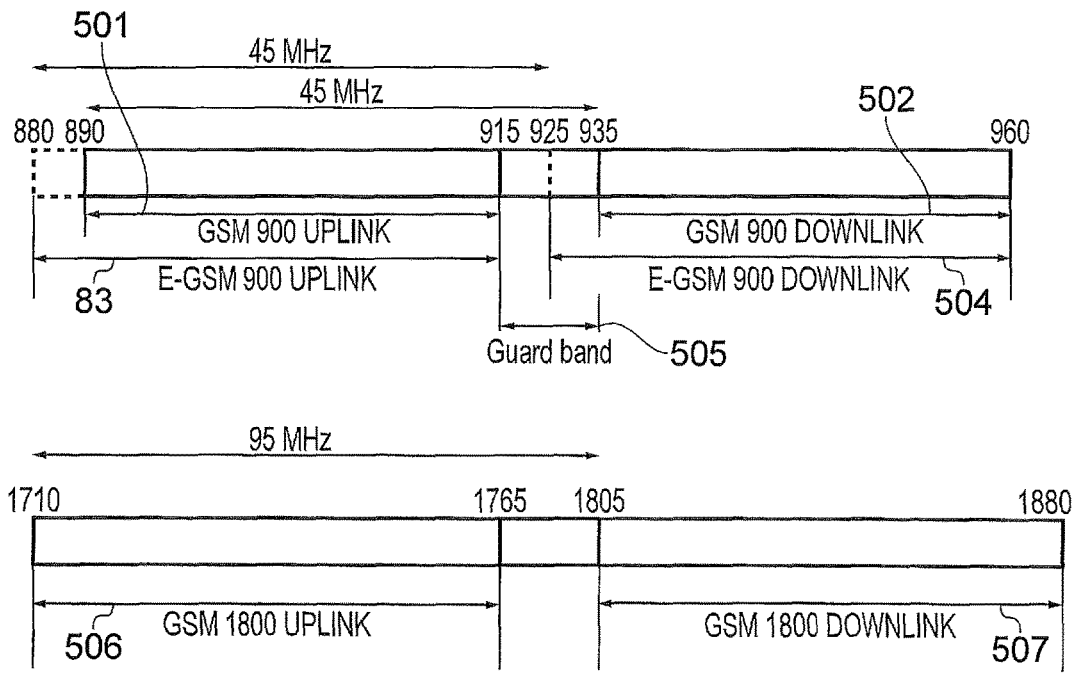
FIG. 5 provides a schematic diagram of example GSM frequency allocations.

FIG. 5 provides an illustration of the GSM900 (501 502), E-GSM900 (503 504) and GSM1800 (506 507) frequency ranges and then divided into uplink (501 503 506) and downlink (502 504 507) frequency ranges where a guard band (505) is present in between the uplink and downlink frequency allocations. Conventionally, each of the uplink and downlink allocations are substantially equal in bandwidth such that uplink and downlink channel pairs can be provided.

Each pair (uplink and downlink) of GSM carriers is designated an Absolute Frequency Channel Number (ARFCN) which can be used to identify the carrier frequencies. Table 1 provides formula for a calculating the frequency of carrier pairs from their ARFCN number for the three aforementioned FSM frequency ranges. In Table 1 the uplink frequency is defined as $F1(n)$ and the downlink frequency $Fu(n)$ where n is the ARFCN number.

TABLE 1

| | | | |
|---|---|---|---|
| GSM900 | $FI(n) = 890 + 0.2 * n$ | $1 \le n \le 124$ $Fu(n)$ | $Fu(n) = FI(n) + 45$ |
| E-GSM900 | $FI(n) = 890 + 0.2 * n$ | $0 \le n \le 124$ $Fu(n)$ | $Fu(n) = FI(n) + 45$ |
| | $FI(n) = 890 + 0.2 * (n-1024)$ | $975 \le n \le 1023$ | |
| GSM1800 | $FI(n) = 1710.2 + 0.2 * (n-512)$ | $512 \le n \le 885$ | $Fu(n) = FI(n) + 95$ |

A characteristic of GSM networks is the implementation of frequency reuse. When planning networks with limited spectrum available, it is advantageous if mobile network operators (MNOs) plan the use of frequencies in each cell so that inter-cell interference is minimised whilst maximising or increasing capacity. In one common example sectorisation may be used where a GSM base station may have three sectors, and each sector is assigned one or more frequency channels k. An operator is likely to have a maximum available number of ARFCN channels, S, depending on the size of the spectrum license it holds. If the S channels are divided among N base stations each of which as three sectors, the number of available channels is S=3 kN Those N base stations that together use the complete set of frequencies available constitute a cluster. In GSM networks the decision on the cluster size is a compromise between capacity and interference. A larger cluster size, such as 7 or 12, provides larger reuse distance and smaller inter-cell interference but requires more frequency spectrum to reach the same capacity as smaller cluster sizes.

Figure 6:
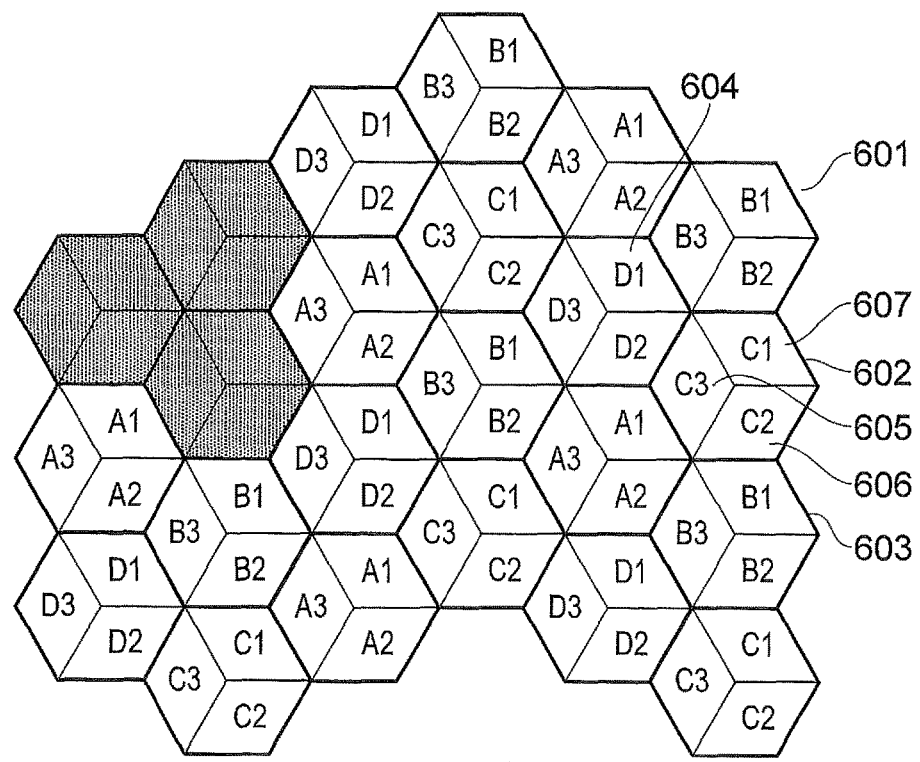
FIG. 6 provides a schematic diagram of an example GSM frequency resuse pattern.

FIG. 6 provides an illustration of frequency reuse in a GSM network, where the cluster size in four. Each cell 601, 602, 603 is divided into three sectors 605 to 607 and each cluster comprises cells A, B, C and D which each use different frequencies. Due to the arrangement of the sectors and cell frequency allocation, no two sectors which share a common frequency are directly adjacent. In the simplified frequency allocations of FIG. 6, due to a cluster size of four the minimum distance between sectors sharing a common frequency is one cell, where for example cells 601 and 603 which share a frequency band are separated by cell 602. As mentioned above, a larger cluster size will result in an increased number of cells/distance between cells which share frequency channels and therefore reduced inter-cell interference may be achieved. However, additional frequencies will be required. For example, in a cluster size of 7 additional frequency resources corresponding to frequencies used in cells E, F and G may be required.

In recent years MNOs have begun to repurpose the GSM spectrum at 1800 MHz into 3G or LTE in order to increase capacity in these systems whereas the legacy voice and M2M use remains at GSM900 bands. For example, in the United Kingdom, LTE has been deployed in at least one MNOs 1800 MHz band but repurposing of GSM900 band assignments has yet to take place. Consequently, it is likely that most of the GSM900 spectrum assigned to MNOs continues to be deployed in the cellular networks today. In light of there being plenty of M2M clients supported by GPRS and GSM900 bands, as well the continuing need to provide basic voice coverage, the low cost of GSM baseband in a handset and the current desirability to avoid the need for countrywide LTE networks, GSM900 networks can be expected to remain in use for several years to come. However, due to limited spectrum availability at 1800 MHz, MNOs may also be interested in repurposing the portions of the 900 MHz or other available GSM bands when they can shut down some GSM frequencies such that the capacity of 3G and LTE networks may be increased.

The repurposing of contiguous portions of frequency bands to LTE may not pose significant problems if the repurposed frequencies are of a sufficient size to provide full bandwidth LTE carriers. For example, if a contiguous portion of frequency of approximately 1.08 MHz or larger were repurposed an LTE carrier with 72 occupied subcarriers may be provided using existing LTE procedures. However, repurposing spectrum on 900 MHz (and 1800 MHz) bands that have GSM still in operation may not as straightforward when considering the operational bandwidth of LTE carriers and the fragmented nature of the available frequencies. In many cases, MNOs are not willing to shut down GSM networks since they provide cheap M2M services to existing customers, and also continue to be used for voice services.

Such problems may be exacerbated by the fact that current 2G licenses at 900 MHz may not be continuous. For example, in the Vodafone and Telefonica 17.5 MHz assignments at 900 MHz band in the United Kingdom, the license consists of three non-contiguous sections. Example frequency allocations for the UK are shown below in Table 2.

TABLE 2

| Operator | GSM900 frequencies (uplink) | Size of frequency license |
|---|---|---|
| Vodafone Limited | 880.1-885.1 MHz | 5.0 MHz |
| Telefónica UK Limited | 885.1-890.1 MHz | 5.0 MHz |
| Vodafone Limited | 890.1-894.7 MHz | 4.6 MHz |
| Telefónica UK Limited | 894.7-902.3 MHz | 5.6 MHz |
| Vodafone Limited | 902.3-910.1 MHz | 7.8 MHz |
| Telefónica UK Limited | 910.1-914.9 MHz | 4.8 MHz |

In some other countries the GSM licenses/frequency allocations are even more fragmented and it is may not be possible to find 4 MHz or 5 MHz assignments. For example, the Czech Republic spectrum licenses show a patchwork of narrow assignments among three operators, where an example of these allocations are shown in Table 3 below.

TABLE 3

| Operator | GSM900 frequencies | Size of frequency license |
|---|---|---|
| Telefónica Czech Republic, a.s. | 880.1-881.9 MHz | 1.8 MHz |
| Vodafone Czech Republic, a.s | 881.9-885.4 MHz | 3.5 MHz |
| Telefónica Czech Republic, a.s. | 885.5-886.9 MHz | 1.4 MHz |
| T-Mobile Czech Republic, a.s. | 886.9-889.9 MHz | 3.0 MHz |
| Vodafone Czech Republic, a.s | 889.9-894.3 MHz | 4.4 MHz |
| T-Mobile Czech Republic, a.s. | 894.3-897.1 MHz | 2.8 MHz |
| Telefónica Czech Republic, a.s. | 897.1-899.9 MHz | 2.8 MHz |
| T-Mobile Czech Republic, a.s. | 899.9-902.1 MHz | 2.2 MHz |
| Telefónica Czech Republic, a.s. | 902.1-904.1 MHz | 2.0 MHz |
| T-Mobile Czech Republic, a.s. | 904.1-906.1 MHz | 2.0 MHz |
| Telefónica Czech Republic, a.s. | 906.1-909.3 MHz | 3.2 MHz |
| T-Mobile Czech Republic, a.s. | 909.3-911.7 MHz | 2.4 MHz |
| Telefónica Czech Republic, a.s. | 911.7-912.9 MHz | 1.2 MHz |
| Vodafone Czech Republic, a.s | 912.9-914.9 MHz | 2.0 MHz |

The use portions of one or more GSM frequencies allocations for the provision of LTE carriers may be challenging unless approaches such as the trading of spectrum licenses in order to rearrange spectrum allocations is used. However, frequency trading has not become an established practice in areas such as Europe where operators are likely to consider other means of exploiting their (scattered) resources which may result from repurposing GSM frequency resources. Furthermore, in addition to the fact that GSM frequency allocations for MNOs are fragmented, due to the frequency reuse in GSM, each cell in a cluster of N cells have different channels in use. Consequently, releasing for example one GSM channel in a reuse scenario of 6 provides six separate frequency bands of 200 kHz.

Figure 7:
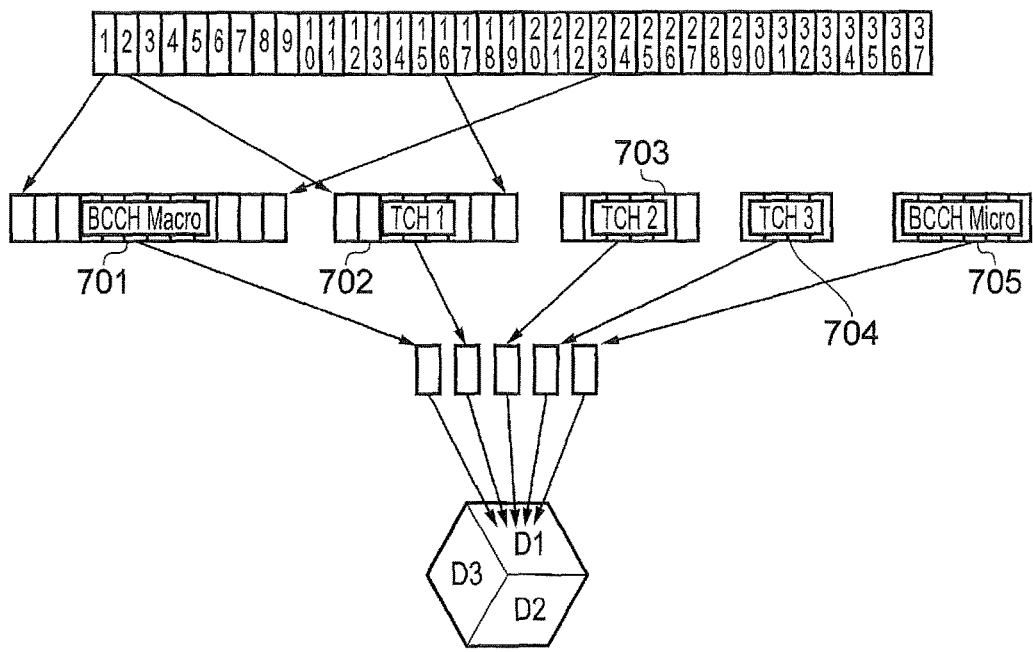
FIG. 7 provides a schematic diagram of an example GSM frequency allocation.

FIG. 7 provides an illustration of frequency use in a GSM system where Broadcast Control Channel (BCCH) Macro 701 utilises channels 1, 3, 5, 7, 9, 11, 13, 15, 17, 19, 21 and 23; Traffic Channel (TCH) 1 7021 utilises channels 2, 4, 6, 8, 10, 12, 14 and 16; TCH2 703 utilises channels 18, 20, 22, 24, 26 and 28; TCH3 704 utilises channels 25, 30, 32 and 34; and BCCH Micro 705 utilises channels 27, 29, 31, 33, 35 and 37. Releasing TCH2 (reuse 6) for example would free channels 18, 20, 22, 24, 26 and 28 and these channels would be available for repurposing in all the cells and sectors of the cluster of size six. However, in spite of 1.2 MHz of spectrum released this way, it may not be possible to fit a conventional LTE carrier in the non-contiguous group of 200 kHz frequency sub-bands that have been freed by releasing TCH 2. Although it may also be possible to release channels associated with channels other than TCH2, due to the arrangement of frequencies in GSM system any further freed channels are also unlikely to be contiguous. Consequently, GSM channels freed for repurposing are unlikely to be contiguous in frequency and thus unsuitable for the provision of a conventional LTE carrier. The repurposing of fragmented GSM resources for LTE communications therefore presents a technical problem of how to utilise non-contiguous frequency resources of GSM channels for the provision of LTE communications. As well as the repurposing of GSM resources for use in LTE systems, a more general technical problem exists of utilising fragmented resources in other communications system which may conventionally utilise contiguous frequency resources. For example, the use of non-contiguous frequency resources to transmit and to receive a logical baseband frame structure such as that of FIG. 3 which may conventionally be transmitted over contiguous frequency resources presents a technical problem.

Fractional LTE Carriers

In accordance with the presently disclosed technique, signals of a first communications system that conventionally operates using a contiguous RF first frequency band may be divided so that one or more of the divided signals may be transmitted in available, repurposed or unoccupied resources of a second or host frequency band, where the second frequency band may include one or more unoccupied channels of a second communications system that would conventionally be too narrow in bandwidth for use in the first communications system. For example, in terms of GSM channels, fractional carriers with a bandwidth less then or equal to a GSM channel may be disposed in each GSM channel. The resources on each of these fractional carriers may be used individually to communicate signals representing data in the first communications system or the resources of the fractional carriers may be used as fragmented resources of the first communications system. In the later case, the resources may be used to form minimum resource or frequency units/blocks that may be individually allocated or, alternatively, aggregated to form larger resource structures such as logical baseband frames that would conventionally be required to be transmitted over a contiguous bandwidth larger than a channel or contiguous portions of the second bandwidth.

In one example, the first system may be an OFDM based system such as an LTE system where fractional carriers or candidate carriers formed from a predetermined number of subcarriers are disposed in contiguous or non-contiguous GSM channels, and resources of these carriers are then used to form a logical LTE carrier which includes logical baseband frames structures. Although the fractional carriers may be disposed in non-contiguous frequency channels, in LTE baseband the resources of the non-contiguous frequency channels and the signal conveyed thereon are combined to form a logical baseband frame of a continuous LTE carrier. Appropriate processing of the signals transmitted and received across the resources of the fractional carriers is then required to logically divide and aggregate the signals such that they appear to have been transmitted across a single conventional LTE carrier and form single logical baseband frame. The arrangement of the fractional carriers as well as the scheduling of data across the fractional carriers may take a number of forms depending on implementation options chosen. A number of different approaches to the provision and use of fractional carriers in repurposed GSM channels for the formation of LTE baseband frame structures and carriers are detailed below.

Figure 8:
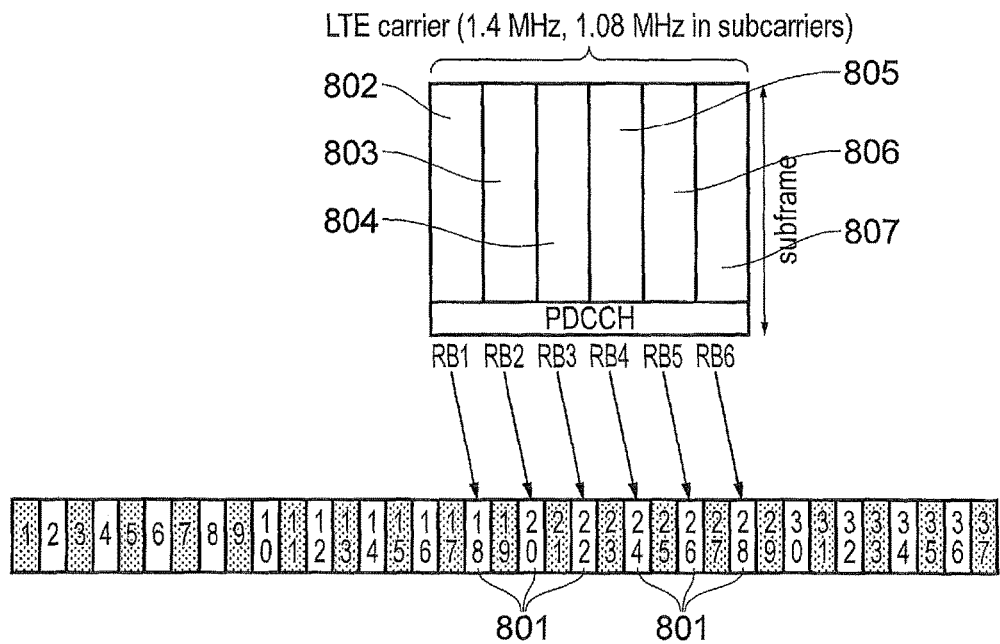
FIG. 8 provides an example of frequency allocations in accordance with the present disclosure.

FIG. 8 provides an illustration showing the aggregation of resources of repurposed GSM channels into a logical baseband frame of an LTE carrier which has occupied subcarriers spanning 1.08 MHz. In FIG. 8, fractional carriers in the GSM channels 18, 20, 22, 24, 26 and 28 801 associated with TCH2 are used to provide resources equivalent to a 1.4 MHz LTE carrier which includes 1.08 MHz in occupied subcarriers. Splitting an LTE carrier constituted from a number of 180 kHz minimum frequency units into its component parts allows the use of each individual 200 kHz channel independently in the RF domain by disposing each minimum frequency units in a 200 kHz channel. The example of FIG. 8 considers six minimum frequency units or resource block bandwidths 802 to 807 which contain 12 LTE resource blocks over a 1 ms period, although for simplicity the LTE logical baseband frame is shown to be formed from six resources blocks RB1 to RB6 where each contains two LTE resource blocks spanning one 0.5 ms slot each. However, the present technique may apply to any LTE bandwidth that is defined today or potentially in future 3GPP releases with differing numbers and positioning of GSM channels required accordingly. Likewise, although the fractional carriers of FIG. 8 are shown to be formed from 12 LTE subcarriers, in other example they may be formed from differing numbers.

In FIG. 8, each of the resources blocks RB1 to RB6 are formed from signals transmitted across a fractional carrier disposed in one of the repurposed GSM channels. For example, the signals comprising RB1 are transmitted across the frequencies of GSM channel 18, the signals comprising RB2 across GSM channel 20 and so forth, and signals forming the PDCCH are transmitted across substantially all of the fractional carriers of the repurposed GSM channels. The signals of each resource block that correspond to an LTE subframe (logical baseband frame) are transmitted across a subcarriers of a fractional carrier over a period corresponding to the duration of an LTE subframe such that signals are divided or fragmented in frequency. As discussed above, the mapping of signals transmitted across the fractional carriers of the repurposed GSM channels to the LTE carrier may take a number of forms, for example the signals representing the data of each resource block may transmitted over a plurality of fractional carriers simultaneously within a single subframe period (frequency fragmentation). Alternatively, the signals representing data of each resource block may be transmitted sequentially across a single fractional subcarrier over a plurality of subframe durations (time fragmentation or dilation). A further alternative may combine the two previous approaches such that the signals representing data of each resource block is transmitted across different fractional carriers but staggered over a plurality of subframe periods for example (frequency and time fragmentation). Each of these approaches shall be described in more detail below.

The creation of fractional carriers enables the deployment of LTE into fragmented frequency resources which would not conventionally be able to accommodate an LTE carrier and thus be unavailable for use by LTE networks. The use of fractional carriers may beneficial in scenarios where MNOs wish to share existing frequency resources with GSM and LTE networks without having to reserve 1 MHz to 2 MHz of contiguous spectrum for the provision of an LTE carrier. Consequently, MNOs may release any GSM channels that are available and deploy LTE into these channels, where previously this was not possible. Thus increasing the flexibility of GSM channel redeployment or repurposing.

Although in FIG. 8 the use of repurposed GSM channels has been described with reference to fractional carriers, the use of the repurposed GSM channels may be described with reference to communications resource units or resource units. For example, a vacant GSM channel and the fractional carrier therein may be divided in time into one or more resource units where the resource units are substantially equal in time to a subframe and have a bandwidth equal to the minimum LTE frequency unit that may be allocated (12 subcarriers or 180 kHz for example), such that the resources contained therein are substantially similar in extent to those contained in two LTE resource blocks of 180 kHz×1 ms. A plurality of resource units may then be used to convey the signals representing the uplink or downlink data of a conventional LTE subframe. Resource units may also be referred to as minimum resource units as they may be viewed as the minimum resources that a conventional LTE subframe may be broken into for transmission across separate non-contiguous frequency resources formed from subcarriers in repurposed GSM channels. However, in some examples the minimum resource units may be larger or smaller in both frequency and time, for instance a minimum resource may have dimensions of 180 kHz×0.5 ms so that it corresponds to a conventional LTE resource block rather then two LTE resource blocks.

The combing/aggregation or dividing functionality of the transmitter and receiver are equivalent to that described above and the signals received using each resource unit are logically aggregated such that the aggregated signal appears to have been transmitted across a single logical baseband frame of a conventional LTE carrier. Furthermore, although in the description below various arrangements of fractional carriers and signals conveyed thereon are described, the arrangements may be also be validly described with reference to resource units.

Whether the use of repurposed GSM channels is viewed in terms of fractional carriers of resource units, an indication of the resources which are going to be used transmit to signals using the repurposed GSM channels is required. In terms of resource units, each available resource unit within a subframe or frame for example may be allocated an index number relative to a subframe or frame so that the resource units that are to be used for a transmission may be indicated to a receiver prior to transmission. Alternatively, a plurality of predefined resource unit patterns may be provided to a communications device such that an indication of a pattern can be provided to a receiver in order to indicate in which resource units signals may be transmitted. As well as the location of the resource unit, the patterns may also provide information on the form of aggregation needed to aggregate the signals from each resource units. In terms of fractional carriers, an indication of the resources to be used may be provided via an indication of the GSM channel which is to be used and a timing of transmissions over the fractional carriers of the GSM channels relative to a subframe or frame.

As is discussed in more detail below, a second wireless interface established via the use of repurposed GSM channels may be provided alone or in addition to a conventional LTE wireless access interface. In the later case it may be possible to provide the above discussed indicators via the conventional LTE wireless access interface prior to the transmission of signals across the repurposed GSM channels.

Figure 9:
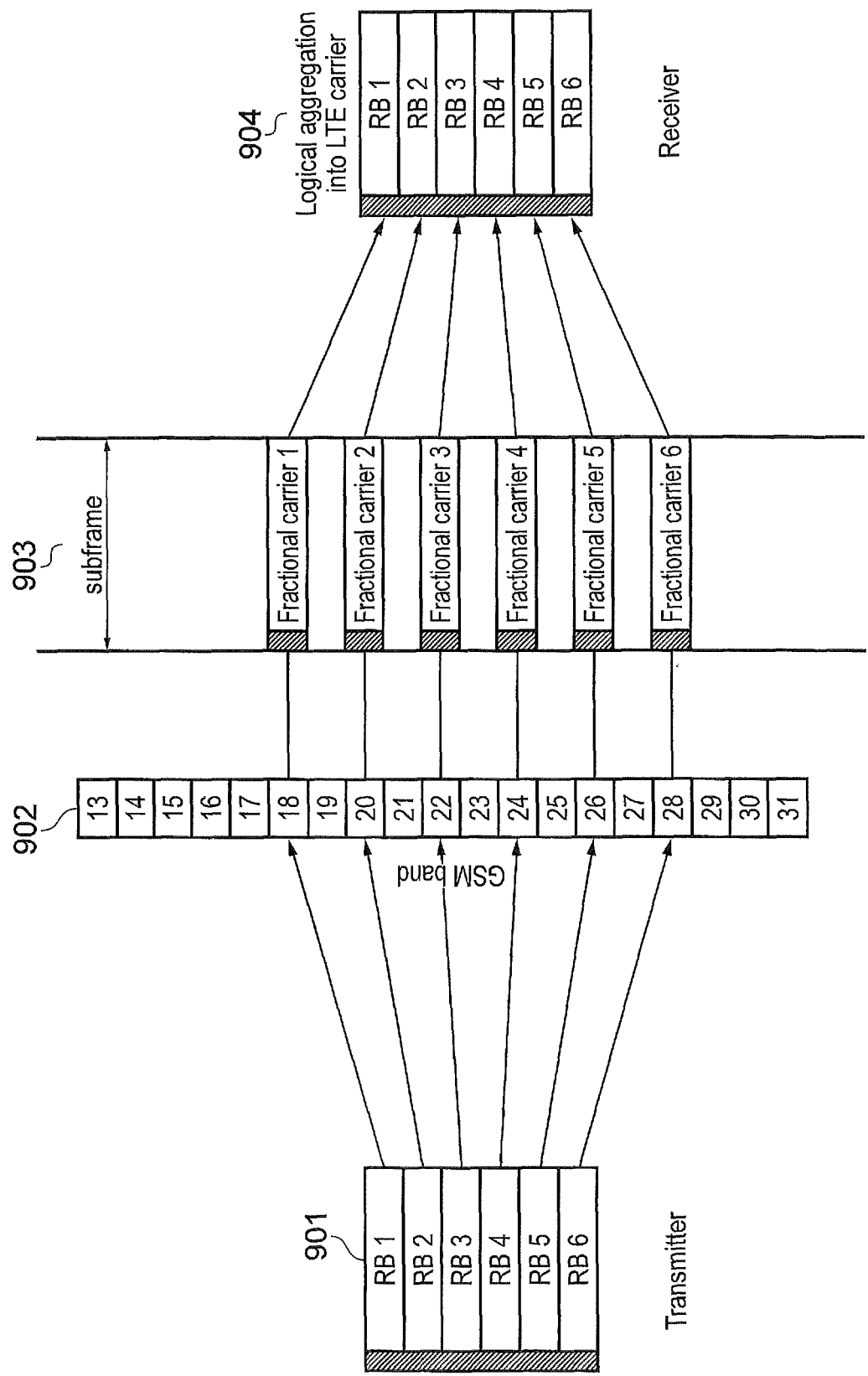
FIG. 9 provides an example of frequency allocations in accordance with the present disclosure.

FIG. 9 provides an illustration of a mapping from resource blocks of an LTE carrier to repurposed GSM channels when signals representing data of the resource blocks is transmitted in parallel across a plurality of minimum frequency units of repurposed GSM channels in the downlink from an eNodeB to a UE. In FIG. 9, at the transmitter the resource blocks 901 are treated as a single LTE carrier at baseband but for transmission the signals of each resource block are mapped to at least one fractional carrier in one or more non-contiguous repurposed GSM channels for parallel transmission. At a receiver the signals are received in parallel across the fractional carriers 903 and then combined to form a conventional LTE carrier and frame in baseband such that the use of non-contiguous fractional carriers for the transmission of the signals is transparent to baseband processing at the receiver. The baseband processing at the transmitter side in the eNodeB is similar to what would take place in a typical implementation, and the baseband frame is treated as six resource blocks constituting a 1.4 MHz carrier. The changes in processing are present at the RF front end side where for example six parallel FFT processes may create the OFDM waveforms of 180 kHz and convert them into respective frequency bands to fit into the vacant GSM channels. There may be other means of creating the fractional carriers, such as an FFT long enough to cover the whole GSM band, and the eventual implementation would depend upon complexity and cost considerations. Consequently, the present technique may be implemented using a number of alternative transmitter and receiver front end and is therefore independent from the actual IFFT/FFT processing done to generate and demodulate the fractional carriers.

Although little alteration to the structure of the subframe in baseband is required, the synchronisation channels PSS/SSS may need redesign since they may be split into separate positions in frequency domain across one or more fractional carriers and thus not necessarily found in the same place. It is possible that configuring a UE to attempt combine multiple N-tuples of fractional carriers in order to find all the constituent parts of PSS and SSS would too complex and therefore a new compatible PSS/SSS arrangement may be required or an indication of the location of the PSS and SSS relative to the available fractional carriers may be provided to the UE.

The use of parallel reception and transmission of signals across fractional carriers may lead to increased complexity. For example, to receive a transmission of the form in FIG. 9, the UE would need to have a receiver RF bandwidth of at least the maximum possible spacing between any two fractional carriers that might form the LTE carrier. At a UE this may lead to a receiver architecture which has an increased complexity, thus leading to increased costs associated with the manufacture of the UE. These disadvantages may be ameliorated by reducing the bandwidth across which signals are transmitted in parallel whilst still enabling a LTE carrier to be formed from the resources over which the signals are transmitted. For example, this may be achieved by as well as utilising resources fragmented in frequency, utilising resources fragmented in time as shown in FIG. 10.

Figure 10:
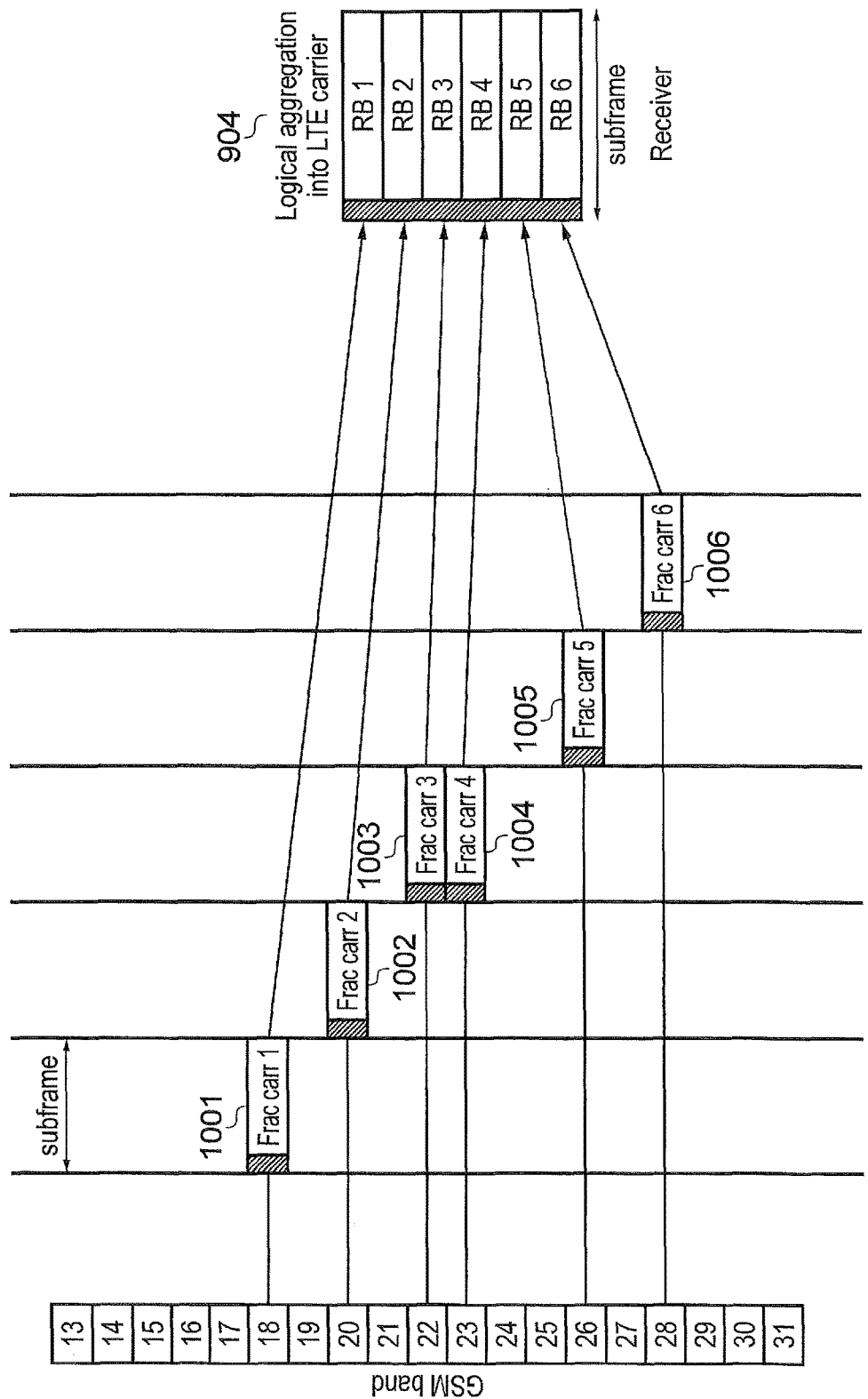
FIG. 10 provides an example of frequency allocations in accordance with the present disclosure.

In FIG. 10, one or more of the signals of the resource blocks of the logical baseband frame structure or LTE carrier are transmitted in a non-parallel manner across one or more fractional carriers such that the transmission of the signals forming the data of subframe 904 are effectively dilated in time. This therefore allows the front end of a UE receiver to tune a narrower frequency compared to the example of FIG. 9 because non-repurposed GSM channels are not included in the tuning bandwidth. For example, in FIG. 10 the signals of the six resource blocks 1001 to 1006 are transmitted across five adjacent subframes where 1003 and 1004 are transmitted in the same subframe because the fractional subcarriers onto which they area mapped are contiguous in frequency. During reception, the UE RF front-end would tune across to different fractional carriers in subsequent subframes. Decoding would only proceed after all the signals of each resource block have been received across the fractional carriers and subsequently aggregated. Although the subframes over which the signals of the resource blocks 1001 to 1006 are transmitted are illustrated in FIG. 10 as being consecutive, they may also be separated in time accordingly to any suitable pattern.

In another example, in order to maintain a reduced size FFT/IFFT compared to the arrangement of FIG. 9, signals transmitted across fractional carriers which are in close proximity but not contiguous may be transmitted in parallel if they fall within the bandwidth of the FFT/IFFT. In this manner smaller FFT/IFFTs may be used than required for FIG. 9 whilst stilling allowing for limited instances where signals are transmitted and received in parallel across non-contiguous fractional carriers. For example, if an FFT/IFFT may process subcarriers which have a bandwidth equivalent to approximately 1 MHz, signals on fractional carriers positioned in GSM channels 18 and 22 may be received simultaneously instead of conveyed across consecutive subframes.

Figure 11:
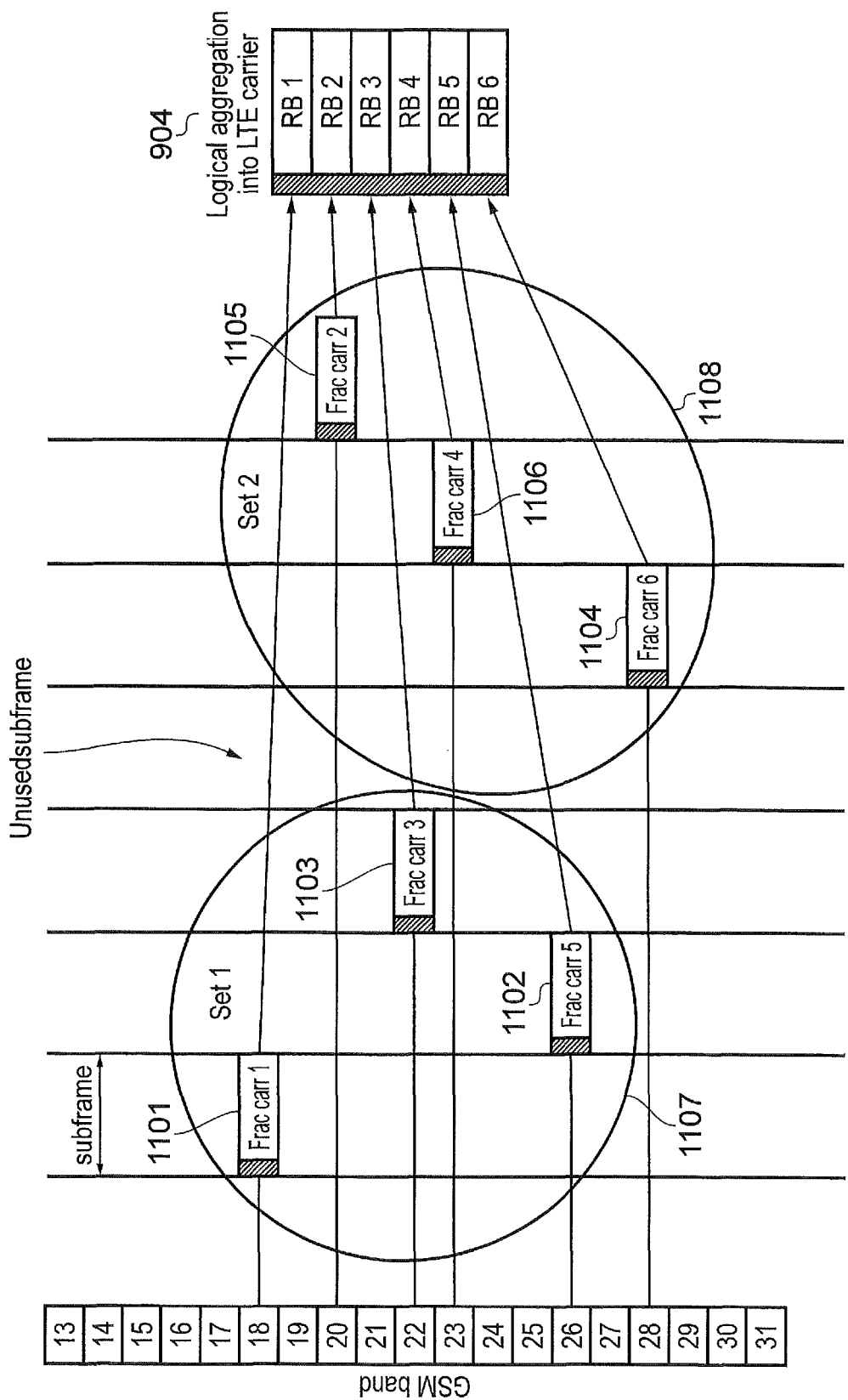
FIG. 11 provides an example of frequency allocations in accordance with the present disclosure.

In FIG. 11, the signals representing data of resource blocks 1101 to 1103 are transmitted in consecutive subframes but a gap of a subframe is introduced before the signals of the resource blocks 1104 to 1106 are transmitted in consecutive subframes, where the gap may be one or more subframes and forms a partition between the two sets of transmissions (Set 1 1107 and Set 2 1108). There may also be one or more time partitions between the transmissions of signals representing data of the resource blocks. Partitioning the time domain transmission may be used in TDD systems where it may not be possible to fit all the subframes in one continuous DL or UL part of the radio frame. The order of the subframes in time domain does not have to be identical to the order of the fractional carriers in frequency domain, i.e. the fractional carriers may be interleaved into a different pattern for transmission over the air interface. This latter point has the advantage of separating frequency-adjacent transmissions in time, amounting to an interleaving of the PRBs, thus helping to distribute time-domain burst-errors over the frequency domain.

Figure 12:
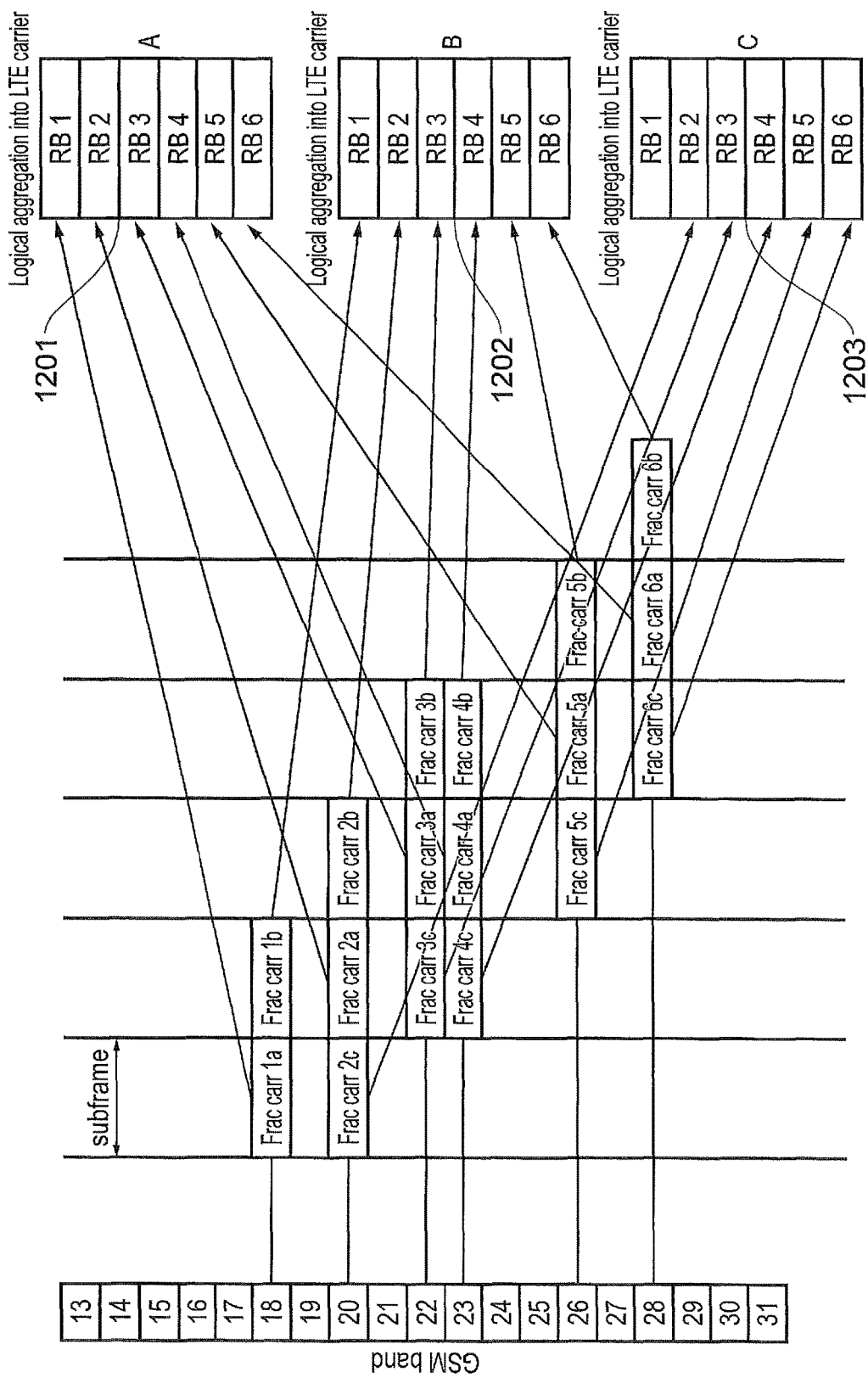
FIG. 12 provides an example of frequency allocations in accordance with the present disclosure.

The use of time fragmentation/dilation for the transmission of data across fractional carriers may increase the latency of transmission because the minimum time for data to be transmitted increases by the number of subframes over which it is fragmented. However, there is little or no reduction in the overall capacity of the fractional carriers because resources of the fractional carriers which area not used may be allocated for use by other UEs. For example, in FIG. 12 a serving eNodeB has scheduled the transmission of signals across the available fractional carriers whereby though the signals forming the subframes of the LTE carriers 1201 to 1203 are fragmented in time, signals for two or more of the subframes are transmitted by the eNodeB in parallel, thus increasing the throughput of the fractional carriers compared to FIGS. 10 and 11. The arrangement of resource allocations on the fractional carriers in such a manner therefore allows efficiency of the use of the resource of the fractional carriers to be increased. A further benefit of this arrangement is that it enables a plurality of LTE carriers/individual logical baseband frames to be multiplexed onto a set of fractional carriers.

Figure 13:
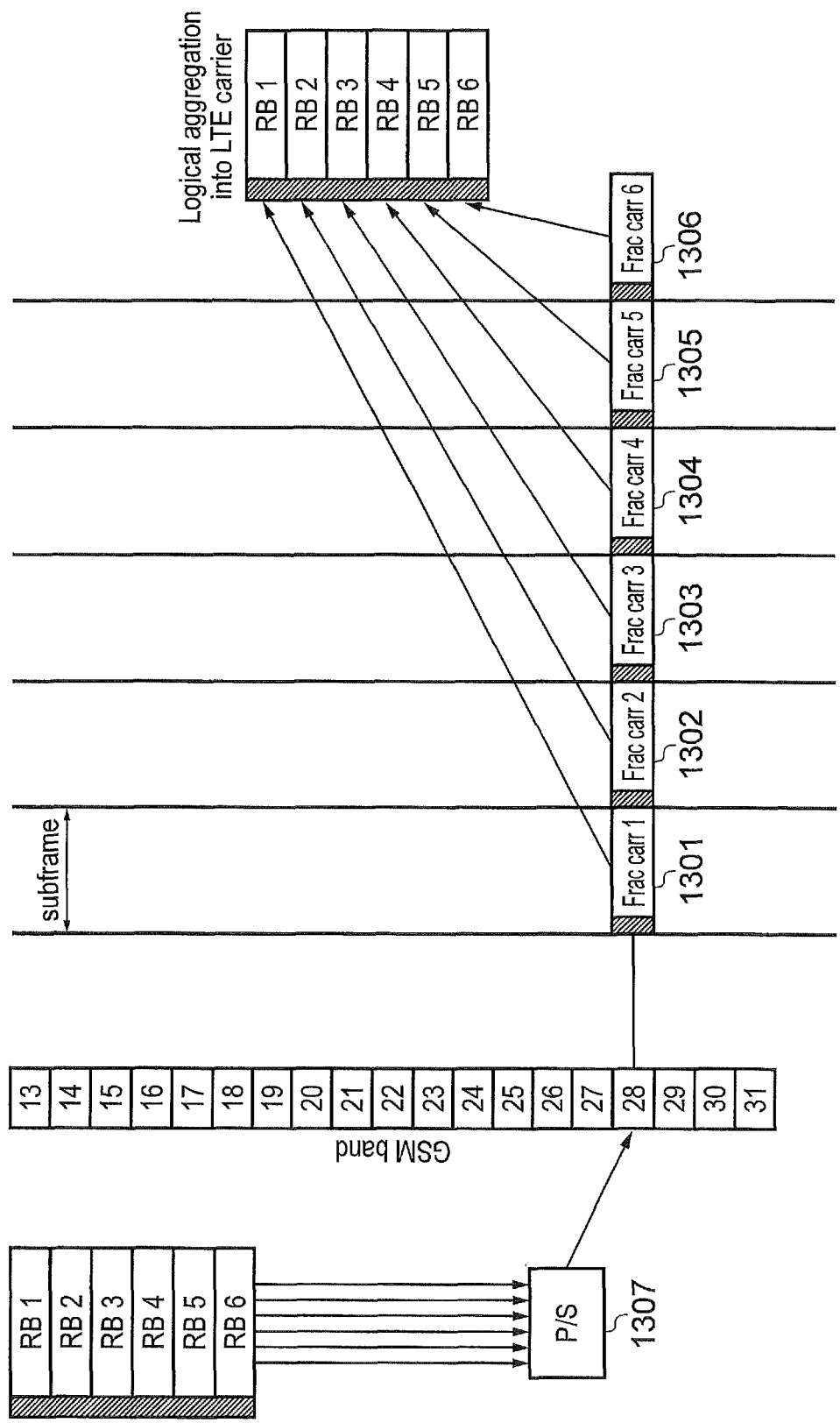
FIG. 13 provides an example of frequency allocations in accordance with the present disclosure.

FIG. 13 provides an alternative implementation of the use of fractional carriers where the signals forming an LTE carrier are fragmented in time across a single fractional carrier whereby signals representing resource blocks 1301 to 1306 are transmitted consecutively or non-consecutively across the resources of a single repurposed GSM channel, which is channel 28 in FIG. 13. Using this approach the bandwidth requirements of a UE's receiver may be reduced as signals 1301 to 1306 are transmitted across a bandwidth of a single fractional carrier (180 kHz in subcarriers). As before, the signals received in each subframe may then be aggregated to form signals an LTE subframe of a LTE carrier which appears to have been transmitted across a conventional contiguous LTE frequency allocation. The use of such an arrangement also provides time dilation without the drawback of different OFDM numerology which would be the case if a 6 physical resource block OFDM signal is dilated by reducing subcarrier distance from 15 kHz to one sixth at 2.5 kHz. Also in FIG. 13 it is shown that an additional parallel to serial conversion step 1307 is required, though as described below a number of different approaches may be used to fragment the signals representing data of a subframe of a logical LTE carrier for transmission over one or more fractional carriers at the transmitter and aggregate the signals received across fractional carriers.

Downlink Processing

The use of fractional carriers or resource units described above provides a number of approaches to the repurposing non-contiguous GSM channels for use in LTE networks. However, in addition to the arrangement of the fractional carriers and the resource units thereon in time and frequency, adapted processing at the front end of the transmitter and receiver may be required to perform logical aggregation of the signals of each fractional carrier and resource unit such that it appears in baseband that signals which form a logical baseband frame have been transmitted across a conventional LTE carrier. The processing of the waveforms/signals used to form the transmissions across the fractional carriers can be done in multiple ways, for example Distributed OFDM covering all fractional carriers
    Individual OFDM processing for each fractional carrier
    Separate processing for each 200 kHz GSM channel.

Figure 14:
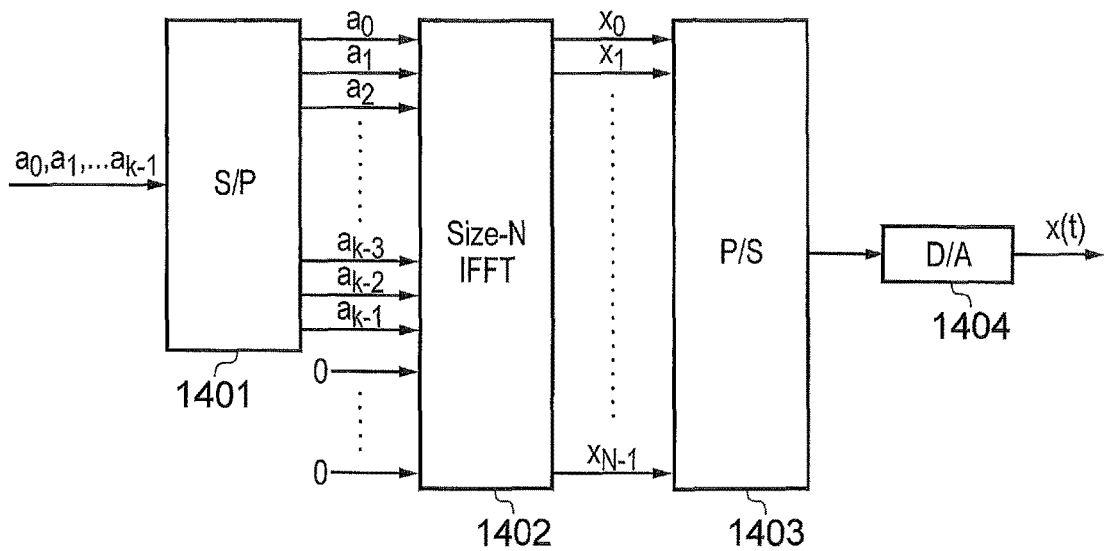
FIG. 14 provides an example OFDM downlink transmitter chain.

A typical but simplified OFDM modulation process in the LTE downlink is depicted in FIG. 14. The modulation apparatus includes a serial to parallel converter unit 1401, an IFFT unit 1402, a parallel serial converter unit 1403 and a digital to analogue converter unit 1404. The input sequence of K symbols $a_0, a_1, \ldots a_{K-1}$ is converted into K parallel streams that each correspond to an LTE subcarrier by the serial to parallel converter unit 1401 and input into the IFFT unit 1402, where the parallel stream is padded with zeros in order to reach a power of two length for N for which the IFFT unit operates. The output of the IFFT unit is converted back to serial form by the parallel to serial converter unit 1403 and fed into the digital-to-analogue converter unit

1404. The output from the digital to analogue converter unit may then be passed to further stages in the transmitter chain such as power amplification, up conversion and frequency filtering for example before final transmission.

Figure 15:
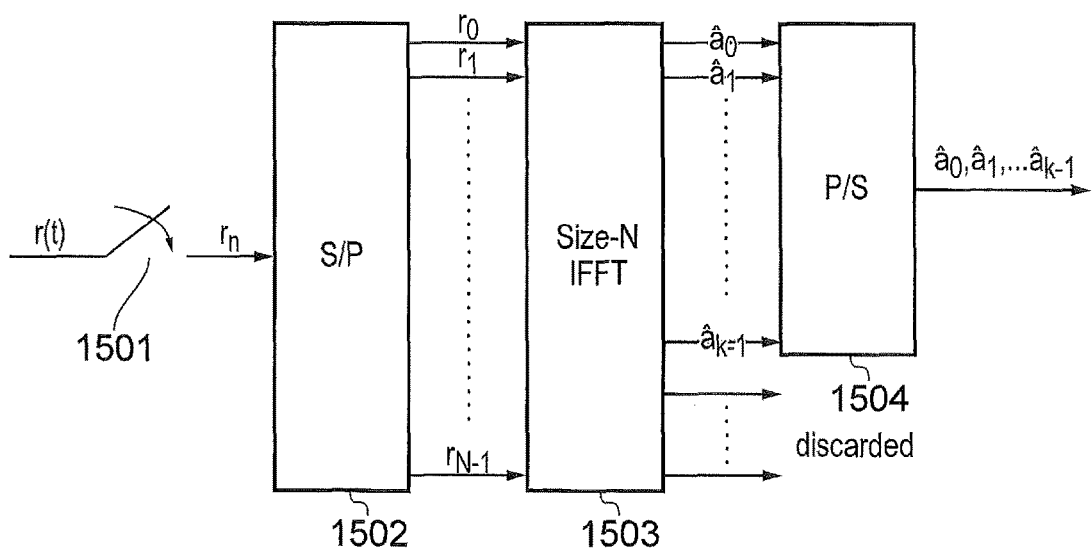
FIG. 15 provides an example OFDM downlink receiver chain.

FIG. 15 provides an illustration of a conventional but simplified OFDM demodulation apparatus that may be found in an LTE UE. The structure of the demodulation apparatus corresponds to the modulation apparatus of FIG. 14 but where approximately inverse operations are performed. The demodulation apparatus comprises an analogue to digital converter or sampler unit 1501, a serial to parallel converter unit 1502, an FFT unit 1503 and a parallel to serial converter unit 1504. The received signal r(t) is sampled by the analogue to digital converter unit 1501 and then converted into a plurality of parallel streams by the serial to parallel converter unit 1402. The parallel streams are then converted into the frequency domain by the FFT unit 1503 and the output streams of the FFT which correspond to the padded zeros of FIG. 14 are discarded. The remaining data streams are converted into serial by the parallel to serial converter unit 1504 and passed to further processing stages such as data estimation.

A conventional modulation architecture may be used to form the signals to be transmitted across the fractional carriers of the repurposed GSM channels however this may lead to increased demands on the RF front end of a transmitter. For example, the IFFT may be stretched to cover the whole 3GPP band 8 (GSM900 band of 35 MHz) giving the possibility of providing OFDM subcarriers into fractional carriers of that band. Preferably, existing GSM carriers which have not been repurposed should be protected by nulls in the IFFT inputs so that the likelihood that OFDM subcarriers are superimposed on top of GSM signals is recued. In current LTE specifications the largest channel bandwidth of 20 MHz is typically covered by a size-2048 IFFT size, which covers the 1200 subcarriers constituting the 18 MHz transmission bandwidth. The 3GPP band 8 would in extreme case contain 2333 subcarriers, so a size-4096 IFFT is of sufficient length to map OFDM subcarriers onto it. In this case the IFFT length would be only twice as big as the IFFT used in 20 MHz processing. Although the generation of OFDM subcarriers with one long IFFT through introducing nulls may be more demanding on the RF front-end, at the eNodeB side one can expect to have linear power amplifiers which do not require a lot of back-off.

Figure 16:
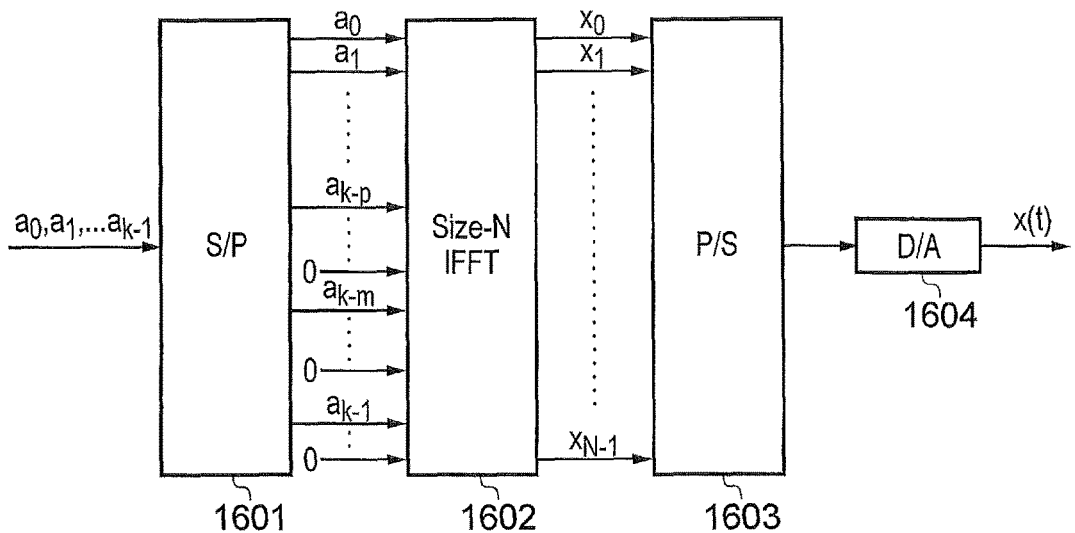
FIG. 16 provides an example OFDM downlink transmitter chain in accordance with the present disclosure.

FIG. 16 provides an illustration of a modulation apparatus where the IFFT covers a substantial proportional of the GSM bandwidth and inputs corresponding to GSM channels which have not been repurposed are padded with zeros. The serial to parallel converter unit 1601, IFFT unit 1602, parallel to serial converter unit 1603 and digital to analogue converter unit 1604 of FIG. 16 are equivalent to those of FIG. 14. However, the size of the IFFT may be larger such that it spans to entire GSM frequency range in which fractional carriers may be deployed.

Figure 17:
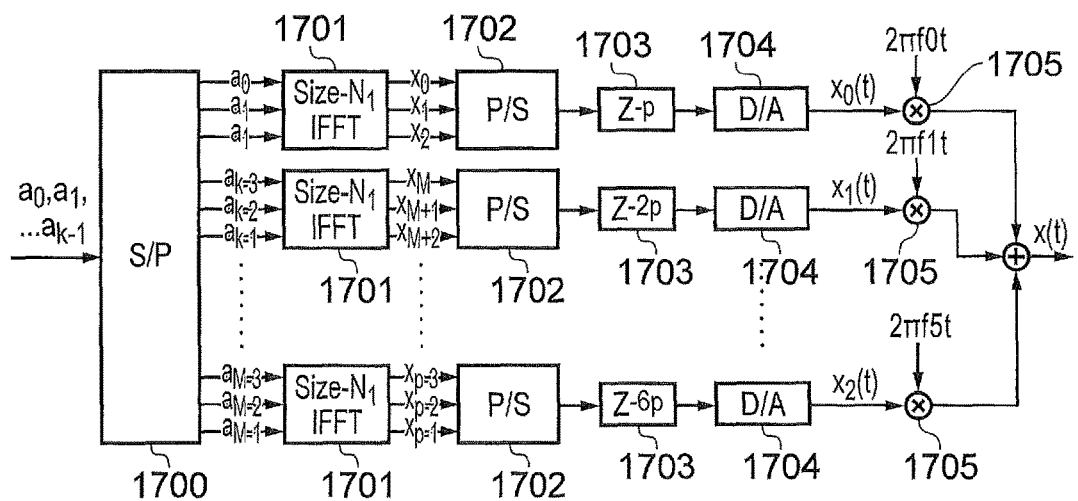
FIG. 17 provides an example OFDM downlink transmitter chain in accordance with the present disclosure.

An alternative to the modulation arrangement of FIG. 16 is to process signals from each fractional carrier in each repurposed GSM channel independently in which case each IFFT/FFT would only cover 12 LTE subcarriers, i.e. one resource block (in practice, it is likely a power-of-2 size (I)FFT would be used, e.g. 16 due to the computational complexity advantages these can afford). Such an arrangement is illustrated in FIG. 17 where the output from the serial to parallel converter unit 1700 is split between a plurality of IFFT units 1701 where the number of IFFTs correspond to the number of fractional carriers/repurposed GSM channels. The output from each individual IFFT unit is then input into a corresponding parallel to serial converter unit 1702, delayed by a predetermined duration by delay elements 1703, converted into the analogue domain by the digital to analogue converter units 1704 and then shifted to the appropriate fractional carrier frequencies by frequency shifter units 1705. The duration by which the signals of each branch of the modulator are delayed is given by qP where P=number of IFFT samples per subframe, and a $Z^{-qP}$ block is a delay of q subframes and the delay depends on the transmission arrangement of the signals across the fractional carriers. For instance, in a serial arrangement as illustrated in FIG. 10 for example, each delay element will delay the signals by a further qP samples in relation to the previous delay element. However, if parallel transmission is utilised as illustrated in FIG. 9 then little or no delay will be required. Although FIG. 17 shows six IFFT blocks and frequency shifters, in actual silicon implementation for serial processing of the transmissions there can be one IFFT unit and one parallel-to-serial unit which are re-used for each consecutive buffered subframe data. In hardware terms, one frequency shifter unit could also be used, although clearly it would have to be tuned to each frequency shift in turn.

The use of the modulation arrangement illustrated in FIG. 17 provides complexity benefits over the arrangement of FIG. 16 due to the reduced size IFFTs required. The complexity reduction can be illustrated by considering the complexity order of an N-point (I)FFT (according to the Cooley-Tukey algorithm for example) is O(N $\log_2$ N). Instead of needing 4096 points to cover the whole GSM band, instead the implementation requires one 16-point transform, so the relative complexity is:

$$\frac{16 \log_2 16}{4096 \log_2 4096} = \frac{1}{768}.$$

Even in the case that multiple, i.e. 6, parallel 16-point (I)FFTs are used, the relative complexity is:

$$\frac{6 \times 16 \log_2 16}{4096 \log_2 4096} = \frac{1}{128}.$$

The demodulation of OFDM signals distributed across a bandwidth may be performed in analogous ways to the modulation. For example, the demodulation may be performed across the whole transmission bandwidth or may only consider each fractional carrier.

Figure 18:
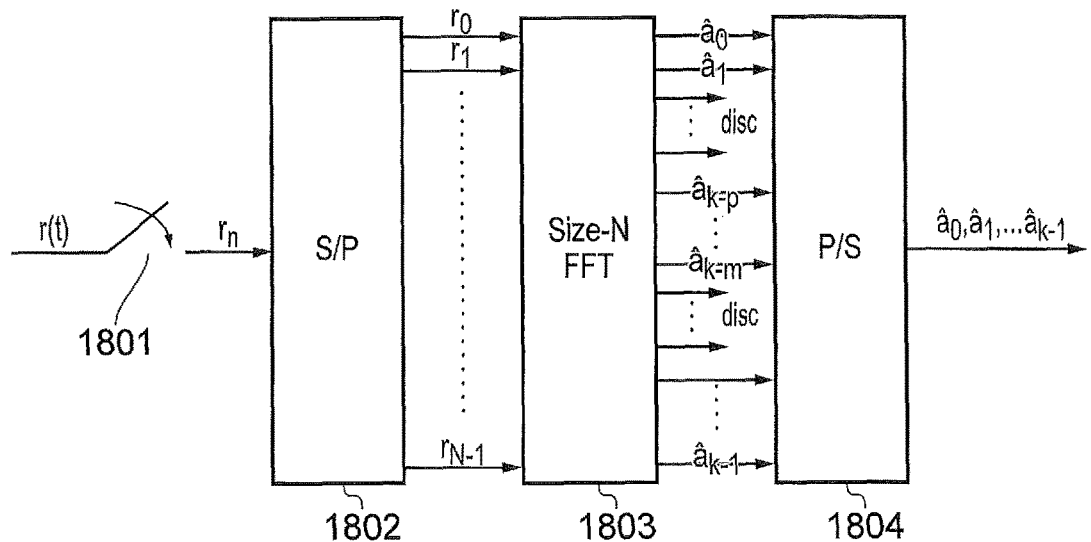
FIG. 18 provides an example OFDM downlink receiver chain in accordance with the present disclosure.

FIG. 18 provides a demodulation arrangement at a UE where a single stretched FFT extending across the whole bandwidth in which fractional carriers may be deployed is used. As in FIG. 15, the received signal is sampled by a sampler unit 1801, and converted to a plurality of parallel streams by a serial to parallel converter unit 1802. The parallel streams are then transformed into the frequency domain by the FFT unit 1803 where the FFT outputs which correspond to GSM channels which have not been repurposed i.e. where there are no fractional carriers, are discarded. The remaining parallel streams are then converted into a serial stream by parallel to serial converter unit 1804. As discussed above with reference to FIG. 16, although this approach provides a conceptually simple approach to receive distributed OFDM signals that may occur when using fractional carriers, the computational complexity associated with a single large FFT is significant and therefore is undesirable at a UE because of the resource constraints normally present at a UE. Consequently, alternatively a demodulation arrangement of FIG. 19 which has multiple chains in a corresponding manner to FIG. 17 may be used.

Figure 19:
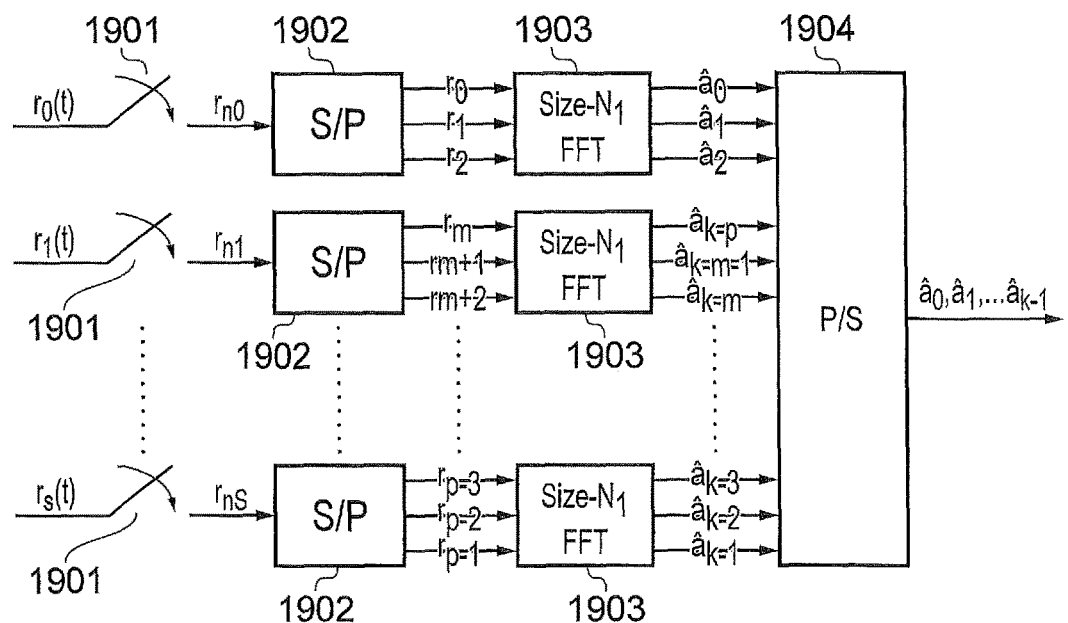
FIG. 19 provides an example OFDM downlink receiver chain in accordance with the present disclosure.

In FIG. 19, the signals received from each fractional carrier are each sampled by sampling units 1901 and input into a serial to parallel converter units 1902. The output from each serial to parallel converter unit 1902 are then input to FFT units 1903, the outputs of which is converted into a serial stream by parallel to serial converter unit 1904 to form a single serial stream that mimics the stream that would be obtained if a single continuous LTE carrier were used instead of an LTE carrier formed from fractional carriers. As discussed with reference to FIG. 17 in a sequential implementation as illustrated in FIG. 13 only a single demodulation chain may be needed due to the staggered arrival of the signals across the fractional carriers however additional buffer or delay elements may be required. Although multiple FFTs and serial to parallel converters are required for the structure of FIG. 19, similar complexity savings may be achieved compared to the structure of FIG. 18 because of the reduced size of the FFT units.

Uplink Processing

An LTE UE is granted uplink resources by an UL resource grant message carried by DL PDCCH. In addition to the data allocation that occupies one or more Physical Resource Blocks of 180 kHz the UE also transmits PUCCH. The PUCCH occupies the upper and lower resource blocks of the logical uplink transmission band, which is e.g. 1.4 MHz, 5 MHz or some other typical LTE bandwidth. Accordingly to the present technique, the actual bandwidth between the lowest and highest fractional carriers in UL would be different and dictated by the actual distribution of unoccupied GSM channels the operator has available. Similarly to downlink, the fractional carrier bands (GSM channels) used by the UE may be indicated by RRC signalling.

As previously mentioned, the LTE uplink utilises SC-FDMA modulation, or pre-coded OFDM as it is also known, (in the UE) and demodulation (in the eNodeB) in order to reduce the peak-to-average power ratio (PAPR) at the UE so that demands on the amplifier at the UE are reduced compared to OFDM. A simplified diagram of LTE SC-FDMA modulation and demodulation apparatus are depicted in FIGS. 20 and 21 respectively.

Figure 20:
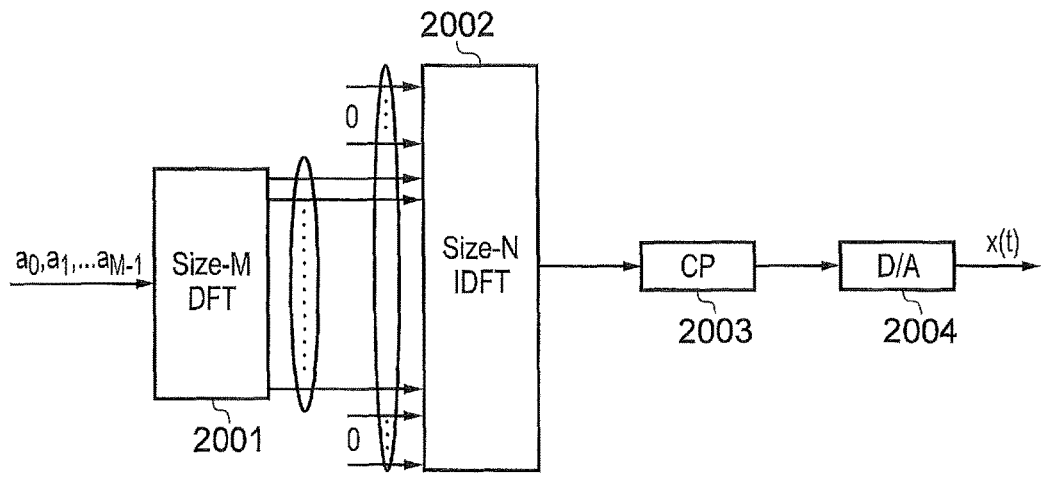
FIG. 20 provides an example SC-FDMA uplink transmitter chain.

In FIG. 20, the data to be transmitted $a_0$, $a_1$, $a_{K-1}$ is "pre-coded" using a DFT unit 2001 the outputs of which are input into an IDFT unit 2002 where one or more inputs may be zero padded into order to achieve an input size equal to the IDFT size. A cyclic prefix is then added to the time domain signal by a cyclic prefix unit 2003 and resulting digital time domain signal is transformed to the analogue domain by digital to analogue converter unit 2004 prior to further processing stages such as amplification.

Figure 21:
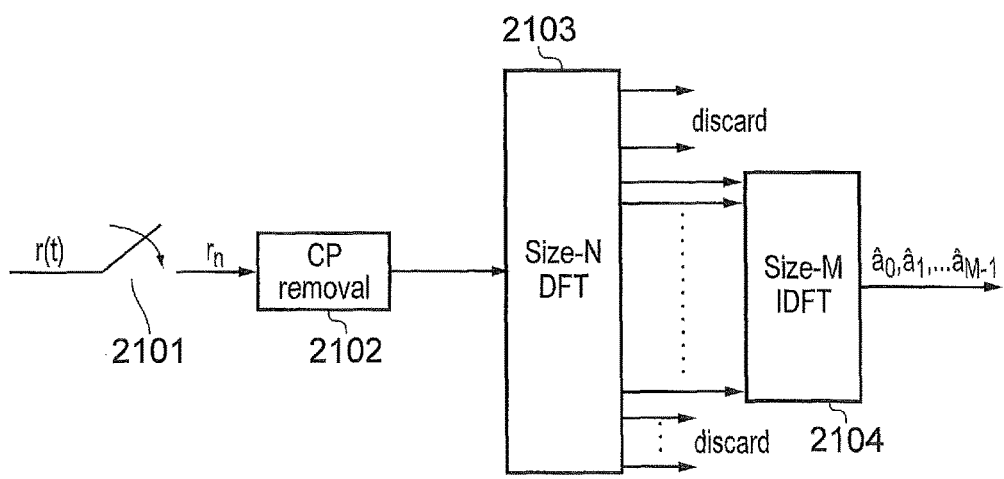
FIG. 21 provides an example SC-FDMA uplink receiver chain.

In FIG. 21, received SC-FDMA LTE signals are sampled by a sampling unit 2101 and the cyclic prefix is removed by a cyclic prefix removal unit 2102. Once the cyclic prefix has been removed the signal is converted into the frequency domain by the DFT unit 2103 and the output samples that correspond to the zero padding are discarded. The signals are then "decoded" by the IDFT unit 1204 to form a stream of estimated samples $a_0$, $a_1$, . . . $a_{K-1}$.

In order to generate more than one carrier in uplink, it is once again possible to use a longer FFT/IFFT length in order to cover the complete width of the band across which the fractional LTE carriers are generated. Introducing nulls into the inputs of the IDFT stage of the SC-FDMA modulator can then be used to create spaces where legacy GSM carriers would be accommodated.

Figure 22:
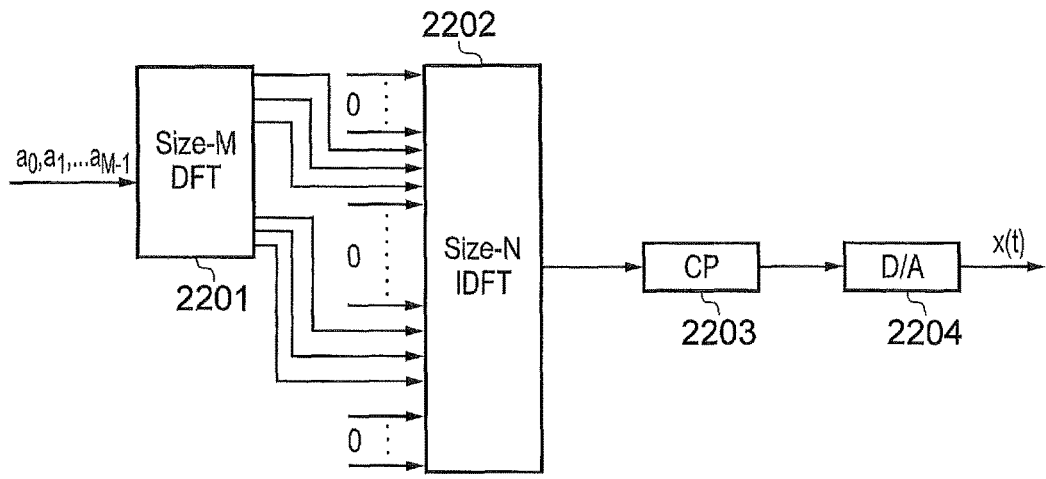
FIG. 22 provides an example SC-FDMA uplink transmitter chain in accordance with the present disclosure.
Figure 23:
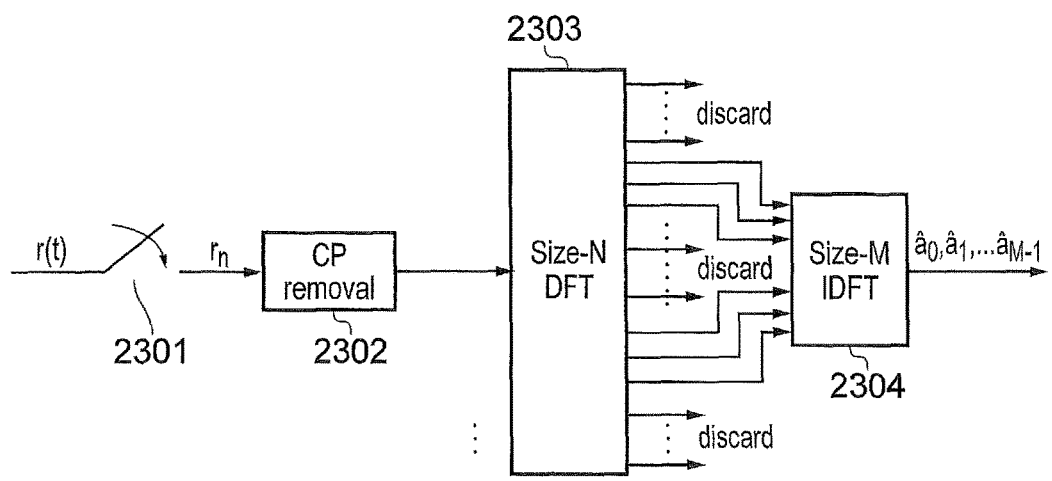
FIG. 23 provides an example SC-FDMA uplink receiver chain in accordance with the present disclosure.

FIGS. 22 and 23 provide illustrations of an approach where a longer IDFT is used to cover the bandwidth across which the fractional carrier are disposed for the transmission and reception of LTE SC-FDMA uplink signals, respectively.

In FIG. 22 the input signals are pre-coded using a DFT unit 2201 and then transformed by the IDFT unit 2202 where inputs which correspond to GSM channels that have not been repurposed for LTE and fractional carriers are padded with zeros. The output of the IDFT unit then has a cyclic prefix attached by the cyclic prefix unit 2203 and the resulting signal is subsequently converted into the analogue domain by the digital to analogue converter unit 2204.

In FIG. 23 the received signal is sampled by a sampler unit 2301 and the digital domain signal then has the cyclic prefix removed by the cyclic prefix removal unit 2302. The signal output from unit 2302 is then transformed by the DFT unit 2303 where the outputs of the DFT which correspond to the non-repurposed GSM channel are discarded. The remaining samples are then decoded by the IDFT to form a single stream which is substantially similar to one that would have been transmitted over a conventional contiguous LTE carrier.

LTE uplink resource allocations originally were in a single cluster but from Rel'10 onwards the LTE specifications also allow for multi-cluster uplink transmissions (two clusters of consecutive PRBs). However, in practice, in order to improve the UE transmitter power amplifier efficiency, the peak-to-average power ratio is preferably kept as low as possible, which is measured in 3GPP specification by the Cubic Metric value. SC-FDMA with one cluster of subcarriers is much more power efficient than multiple separate uplink waveforms. For the purposes of Machine Type Communications for example, it is unlikely that high bit rates will be required and therefore that two PRBs in uplink would be necessary. Thus, even in the case of completely fragmented 200 kHz GSM channels, LTE Rel'10 multi-cluster solution would likely suffice through providing two 180 kHz uplink carriers.

Figure 24:
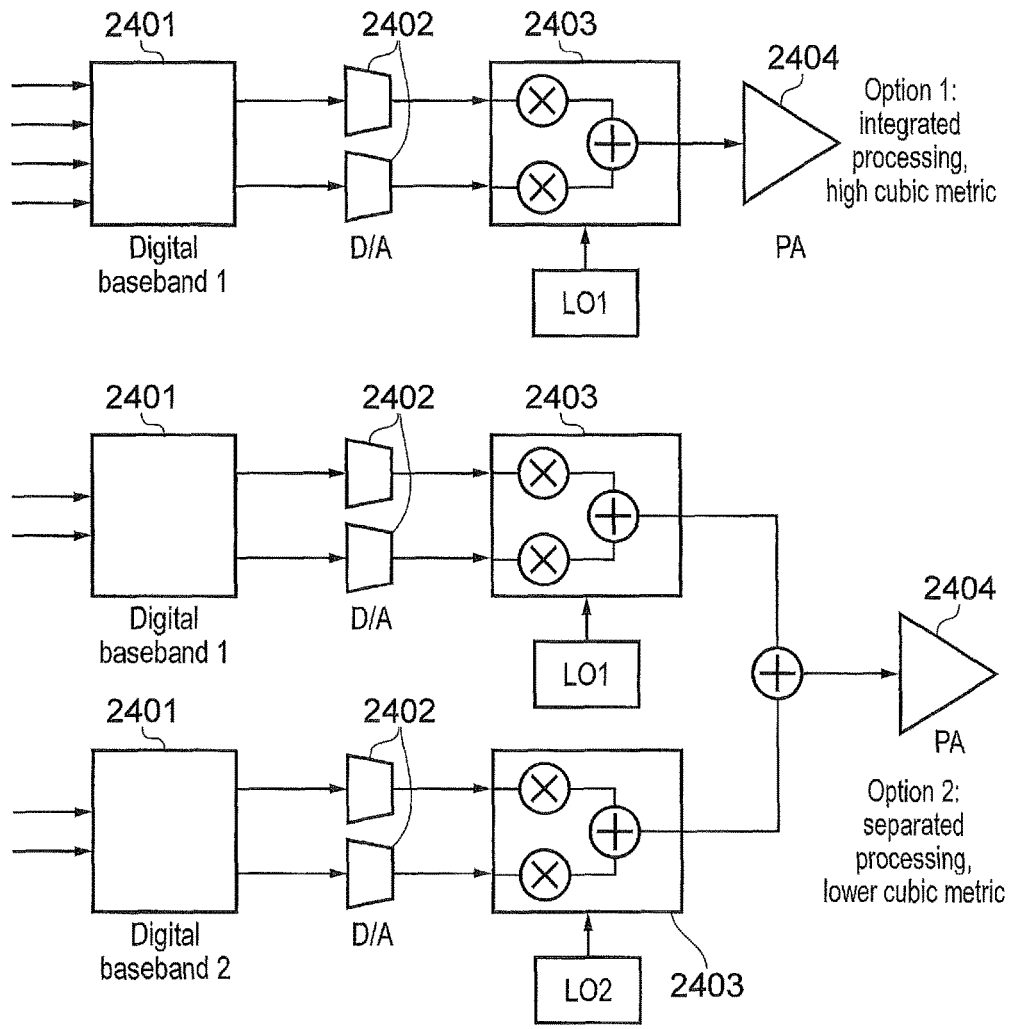
FIG. 24 provides an example SC-FDMA uplink transmitter chain in accordance with the present disclosure.

The actual processing of the multi-cluster transmission has an impact on the cubic metric. As depicted in FIG. 24, the UE can be implemented with integrated processing (option 1) where all the baseband components (digital baseband converters 2401 and digital to analogue converters 2402) and radio front-end (up converter and addition unit 2403) are shared with the uplink carriers prior to amplification by power amplifier 2404. This will introduce a need for power amplifier back-off due to high cubic metric. Option 2 provides lower cubic metric due to independent processing for each uplink carrier and only the final power amplification takes place jointly. This may however increase baseband and RF front-end complexity and cost.

Figure 25:
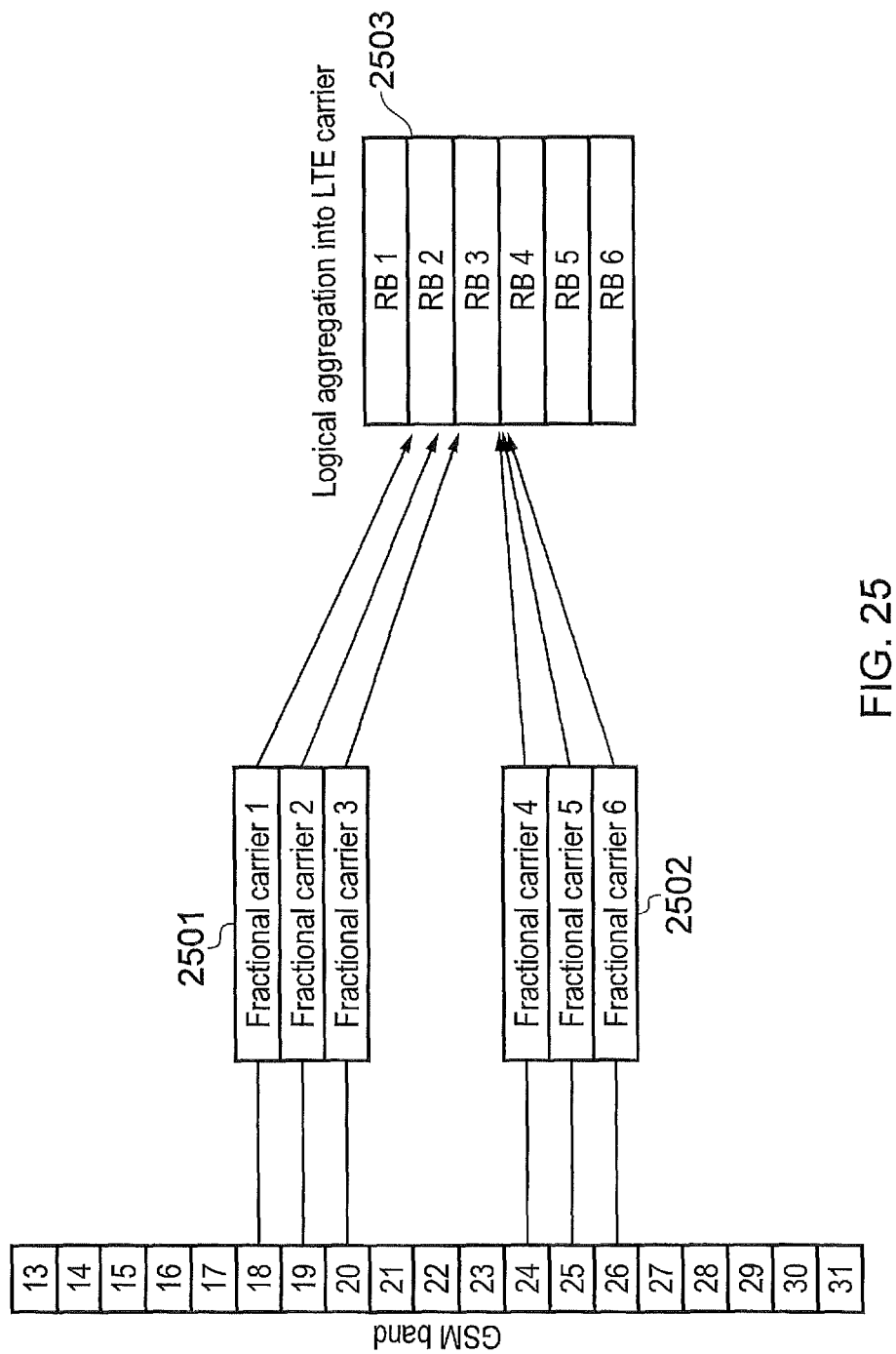
FIG. 25 provides an example of frequency allocations in accordance with the present disclosure.

The present technique allows uplink resources to be fragmented into as many fractional carriers as the downlink. However, the possible disadvantages associated with fragmented uplink carriers in terms of the cubic metric means that it would be beneficial if there an element of clustering of fractional carriers is maintained in the uplink. FIG. 25 provides illustration of the fractional carriers of an LTE uplink where the fractional carriers have been grouped into two clusters in order to constrain the increase in the cubic metric that is likely to occur due to the fragmentation of the uplink resources. In particular the fractional carriers 1 to 6 have been grouped into two clusters 2501 and 2502. The signals from the fractional carriers of each cluster are then formed into a signal logical carrier 2503 by the modulation and demodulation arrangements of FIGS. 22 and 23.

The Physical Random Access Channel (PRACH) in uplink occupies six physical resource blocks, i.e. 1.08 MHz. The PRACH configuration is indicated in SIB2 and the UEs transmit PRACH preamble in the same contiguous PRBs of the logically aggregated uplink channel as they would do in the usual LTE band. The preamble is distributed over the fractional carriers over the actual frequency resources and logically aggregated by the eNodeB receiver after the receipt of all the constituent fractional carriers as described above.

In a similar manner to that described with reference to the downlink, a means to convey information on the allocation of resources of the fractional carriers to the UE may be required for the uplink. This may be done by providing an explicit indication to the UE from the network element of the resources of the fractional carriers that may be used, or alternatively an indication of a particular pattern of allocated resources of fractional carriers may be provided to a UE via a pattern reference indicator for example.

UE Procedure

Figure 26:
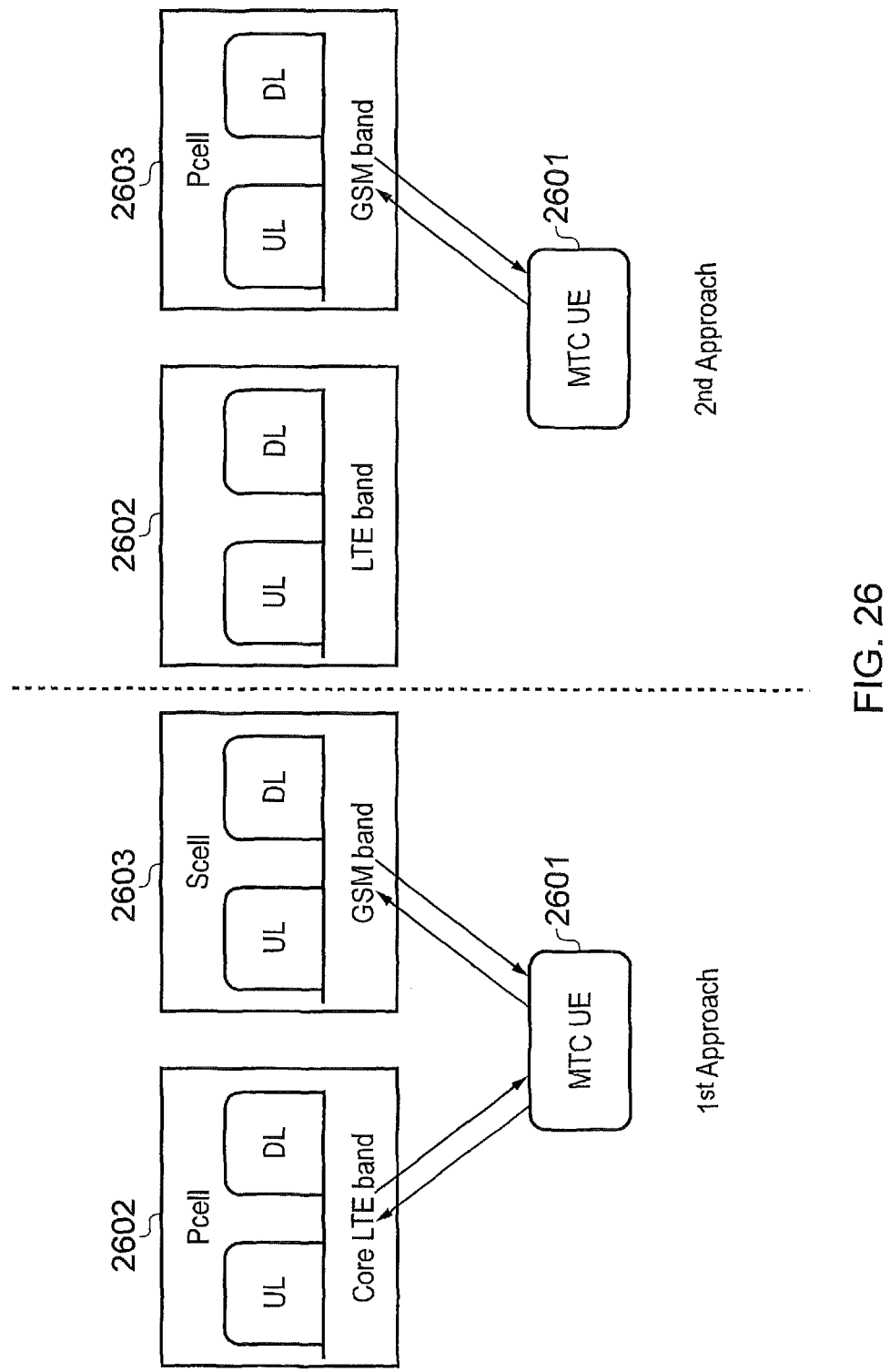
FIG. 26 provides an example of the use of frequency allocations in accordance with the present disclosure.

The capabilities and capacity advantages associated with the use of fractional carrier aggregation may be exploited in a number of different approaches. Two such approaches are illustrated in FIG. 26. For example, in a first approach
1) The UE 2601 is connected to a primary cell (Pcell) using a main LTE band 2602 which provides all the synchronisation and RRC signalling. Fractional carriers in a GSM band 2603 are considered as a logical component carrier in carrier aggregation setup.
2) The UE 2601 is only connected to the eNodeB with the fractional carriers in a GSM band 2603 which thus constitute Pcell and also provide synchronisation and RRC signalling.

The first option may have a recued complexity because the UE may not have to perform cell search procedures on frequency resources where it is not easy to find PSS/SSS. On the other hand, this option mandates the use of carrier aggregation.

The second option likely requires specification changes on synchronisation signals which may need optimisation to be more easily discovered by a UE. This option does provide for independent deployment on the fractional carrier band however, which may provide cost benefits in particular for MTC devices.

The implementation of the second option may be simplified by allowing a UE to utilise fractional carriers only following a handover command from a normal LTE eNodeB. The handover message from the source eNodeB can include information used during initial setup on the GSM band. Some essentials would include the frequency location of each fractional carrier and if the operation was parallel or serial; in the latter case also the subframe-to-fraction mapping could be included.

Typically, the arrangement of the frequency location of the fractions would change very slowly with time since they depend on clearance of GSM signals. When a re-configuration of the fractional carriers is needed, a broadcast indication of the impeding change can be sent on the existing fractional carriers, and this can include the frequency and/or the arrangement to be used after an indicated point in time. The broadcast notification could contain the time point itself, or similar to normal LTE system information broadcast, the point in time could be a regularly occurring modification boundary.

Discovery

In additional to the signal processing requirements at a transmitter and receiver for enabling the use of fractional carriers in LTE, the means by which fractional carriers are discovered or indicated to UE requires consideration. Two main approaches may be used to provide fractional carrier information to UE. In a first approach a serving eNodeB may indicate to the UE the presence and location of fractional carriers. In a second approach UE may perform autonomous discovery of fractional carriers or GSM channel which are vacant and in which fractional carriers may be established.

The use of handover messages discussed above provides a means by which a UE may be provided with a location of available fractional carriers or GSM channel in which fractional carriers may be established. However, the use of handover messages may not be suitable in the case where a UE enters an area where a fractional carrier(s) has been deployed but the currently-serving eNodeB is not aware of the fact, is not configured to provide relevant information at handover, or is switching on at 'cold boot' and has no serving eNodeB yet. For these cases, it may be advantageous in some autonomous discovery of the fractional LTE transmissions is be introduced.

Initially when a UE enters a standalone fractional carrier cell it is required to acquire synchronisation, however it may not know in which of the fractional LTE carriers, i.e. GSM carriers, a synchronisation signal is being transmitted. Current synchronisation signals in LTE span 72 LTE subcarriers, so shorter versions or differently-designed signals would be needed. A number of possible options for the discovery of fractional carriers may be used, for example The UE may search each GSM carrier to see if it can decode a fractional carrier discovery signal on any of them. This would require searching potentially many GSM carriers, but gives the eNodeB increased flexibility compared limiting the GSM carriers it may search.

The UE may search a pre-determined subset of the GSM carriers to see if it can decode a fractional carrier discovery signal on any of them. The pre-determination can be provided by specifications in the standalone case. In a scenario where a handover is used, instead of the handover message giving precise details of the fractional carrier, it may give the pre-determined subset of GSM carriers which the receiving fractional carrier discovery signal can use. The eNodeB operating the fractional carrier can then move the discovery/synchronisation signal over time. This also assists inter-operator roaming where different network operators will have different free GSM carriers.

The UE may have GSM receiver functionality which allows it to detect and find active GSM carriers. Any GSM channels that do not have GSM signal in them would constitute a subset of carriers that the UE would try to decode discovery signal on.

The discovery signal might be transmitted in one of the e.g. 6 fractional carriers repurposed from GSM to create the LTE carrier, or it might be transmitted in an additional GSM carrier to avoid polluting the LTE resources.

The fractional carrier discovery signal could have the dual purpose of discovery and synchronisation, or it may provide only discovery since it is likely to be shorter in length than current LTE synchronisation signals. In this case, the discovery signal could give some fundamental information on the structure of the fractional carrier, i.e. the GSM carriers that comprise it and any time-domain serial mapping that is needed. Typically, the signal would be too small to provide more detailed information which would be carried in SIBs on the whole fractional carrier in the conventional way.

Figure 27:
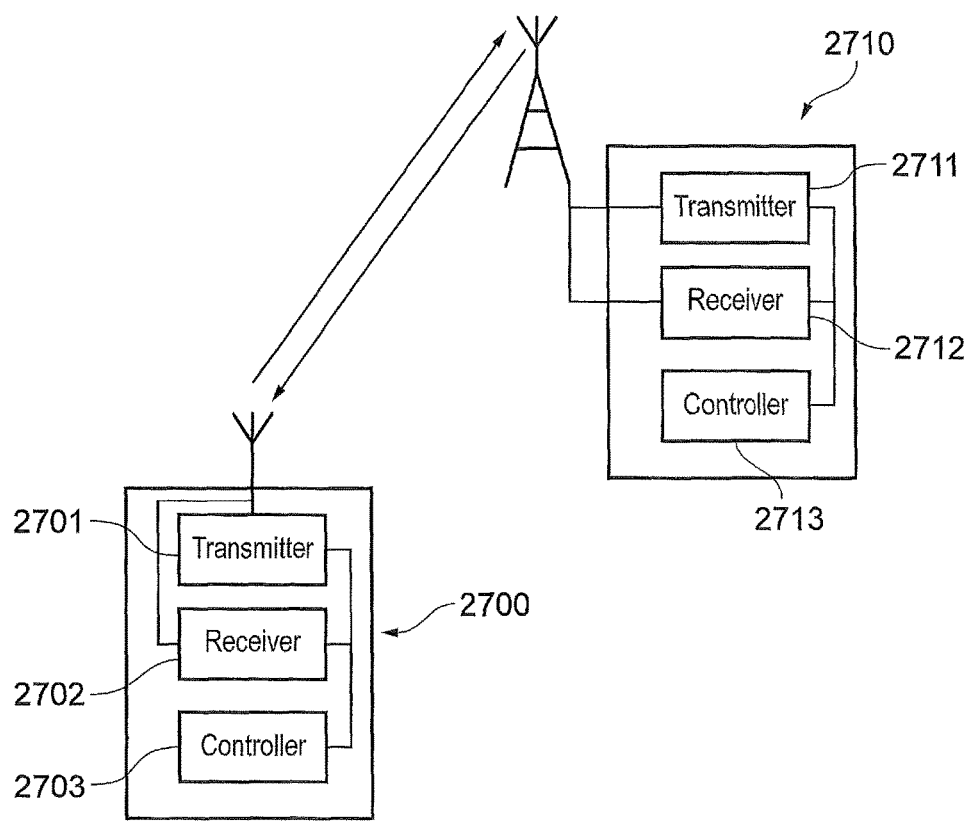
FIG. 27 provides a schematic diagram illustrating a communications device and a network entity of a mobile telecommunications network.

FIG. 27 provides a schematic diagram of a UE 2700 and an eNodeB 2710 in which examples of the presently disclosed technique may be implemented. The UE includes a transmitter 2701, a receiver 2702 and a controller 2703, where the controller is configured to control the receiver 2702 to detect signals representing control data and user data transmitted by the eNodeB 2710, and to estimate the data conveyed by the signals. The controller 2703 is also configured to control the transmitter 2701 to transmit signals representing uplink control data and user data to the eNodeB. Although in FIG. 27 the UE 2700 is illustrated as comprising a separate transmitter and receiver, it may instead comprise a transceiver which is configured in combination with the controller to implement the aforementioned features and techniques. The controller 2703 may comprise a processor unit which is suitably configured/programmed to provide the desired functionality described herein using conventional programming/configuration techniques for equipment in wireless telecommunications systems. The transmitter 2701, receiver 2702 and controller 2703 are schematically shown in FIG. 27 as separate elements for ease of representation. However, it will be appreciated the functionality of these units can be provided in various different ways, for example using a single suitably programmed general purpose computer, or suitably configured application-specific integrated circuit(s)/circuitry, or using a plurality of discrete circuitry/processing elements for providing different elements of the desired functionality. It will be appreciated the UE 2700 will in general comprise various other elements associated with its operating functionality in accordance with established wireless telecommunications techniques (e.g. a power source, possibly a user interface, and so forth).

The eNodeB 2710 includes a transmitter 2711, a receiver 2712 and a controller 2727, where the controller 2727 is configured to control the transmitter 2711 to transmit signals representing control data and user data to UEs within a coverage area such as the UE 2700, thus providing a wireless access interface to UEs within the coverage area. The controller 2713 is also configured to control the receiver 2713 to detect signals representing user control and uplink data and estimate the data conveyed by these signals. Although in FIG. 27 the eNodeB 2710 is illustrated as comprising a separate transmitter and receiver, it may instead comprise a transceiver which is configured in combination with the controller to implement the aforementioned features and techniques at the eNodeB. The controller 2713 may comprise a processor unit which is suitably configured/programmed to provide the desired functionality described herein using conventional programming/configuration techniques for equipment in wireless telecommunications systems. The transmitter 2711, receiver 2712 and controller 2713 are schematically shown in FIG. 27 as separate elements for ease of representation. However, it will be appreciated that the functionality of these units can be provided in various different ways, for example using a single suitably programmed general purpose computer, or suitably configured application-specific integrated circuit(s)/circuitry, or using a plurality of discrete circuitry/processing elements for providing different elements of the desired functionality. It will be appreciated the eNodeB 2710 will in general comprise various other elements associated with its operating functionality in accordance with established wireless telecommunications techniques. For example, the eNodeB 2710 will in general comprise a scheduling entity responsible for scheduling communications. The functionality of the scheduling entity may, for example, be subsumed by the controller 2713.

The following numbered clauses provide further example aspects and features of the present technique:

1. A communications device for communicating data, the communications device comprising
a receiver for receiving signals representing downlink data from a network element of a wireless telecommunications system via a wireless access interface having a logical baseband frame structure,
a transmitter for transmitting signals representing uplink data to the network element via the wireless access interface, the logical baseband frame structure being formed from one or more minimum frequency units and one or more time units to form communications resources for allocation by the network element to the communications device, and
a controller for controlling the transmitter and the receiver to transmit and to receive signals representing the data to and from the network element using the wireless access interface, wherein the controller is configured in combination with the transmitter and the receiver
to receive an indication of one or more frequency resources within a host frequency band,
to combine the one or more frequency resources within the host frequency band in time and/or frequency to form the one or more of the minimum frequency units of the logical baseband frame structure, and
to transmit or to receive the signals representing the data to or from the network element using the communications resources provided by the one or more minimum frequency units formed within the host frequency band.

2. A communications device according to clause 1, wherein the frequency resources within the host frequency band are non-contiguous in frequency.

3. A communications device according to clause 1 or 2, wherein the frequency resources within the host frequency band are combined for a plurality of time units to form the communications resources corresponding to the one or more minimum frequency units.

4. A communications device according to clause 1 to 3, wherein the frequency resources within the host frequency band are combined for a single time unit to form the communications resources corresponding to the one or more minimum frequency units.

5. A communications device according to clauses 1 to 4, wherein the host frequency band includes one or more unoccupied GSM channels and each of the one or more minimum frequency units of the host band are positioned in a one of the unoccupied GSM channels.

6. A communications device according to any of clauses 1 to 5, wherein the signals representing uplink data are transmitted and received in accordance with SC-FDMA.

7. A communications device according to any of clauses 1 to 6, wherein the signals representing downlink data are transmitted and received in accordance with OFDM.

8. A communications device according to any of clauses 1 to 7, wherein the minimum frequency units are formed from a predetermined number of subcarriers and one or more of the subcarriers within the host frequency band are non-contiguous.

9. A communications device according to any of clauses 1 to 8, wherein controller is configured in combination with the receiver to receive an indication from the network element of the one or more minimum frequency units formed within the host frequency band.

10. A communications device according to any of clauses 1 to 9, wherein the controller is configured in combination with the receiver and the transmitter to also receive and transmit signals representing data using the logical baseband frame structure and frequency resources of a contiguous frequency band.

11. A network element of a wireless telecommunications system for communicating data to and from a communications device, the network element comprising
  a receiver for receiving signals representing uplink data from the communications device via a wireless access interface having a logical baseband structure,
  a transmitter for transmitting signals representing downlink data to the communications device via the wireless access interface, the logical baseband frame structure being formed from one or more minimum frequency units and one or more time units to form communications resources for allocation by the network element to the communications device, and
  a controller for controlling the transmitter and the receiver to transmit and to receive signals representing the data to and from the communications device using the wireless access interface, wherein the controller is configured in combination with the transmitter and the receiver
    to determine one or more available frequency resources within a host frequency band,
    to combine the one or more available frequency resources of the host frequency band in time and/or frequency to form communications resources corresponding one or more of the minimum frequency units and the logical baseband frame structure, and
    to transmit or to receive the signals representing the data to or from the communications device using the communications resources provided by the one or more minimum frequency units formed within the host frequency band.

12. A network element according to clause 11, wherein the frequency resources within the host frequency band are non-contiguous in frequency.

13. A network element according to clause 11 or 12, wherein the frequency resources within the host frequency band are combined for a plurality of time units to form the communications resources corresponding to the one or more minimum frequency units.

14. A network element according to clause 11 to 13, wherein the frequency resources within the host frequency band are combined for a single time unit to form the communications resources corresponding to the one or more minimum frequency units.

15. A network element according to any of clauses 11 to 14, wherein the second band includes one or more unoccupied GSM channels and each of the one or more minimum frequency units of the host frequency band are positioned in a one of the unoccupied GSM channels.

16. A network element according to any of clauses 11 to 15, wherein the signals representing uplink data are transmitted and received in accordance with SC-FDMA.

17. A network element according to any of clauses 11 to 16, wherein the signals representing downlink data are transmitted and received in accordance with OFDM.

18. A network element according to any of clauses 11 to 17, wherein the minimum frequency units are formed from a predetermined number of subcarriers and one or more of the subcarriers within the host frequency band are non-contiguous.

19. A network element according to any of clauses 11 to 18, wherein the controller is configured in combination with transmitter to transmit to the communications device an indication from the network element of the one or more minimum frequency units formed within the host frequency band.

20. A network element according to any of clauses 11 to 19, wherein the controller is configured in combination with the receiver and the transmitter to also receive and transmit signals representing data using the logical baseband frame structure and frequency resources of a contiguous frequency band.

21. A wireless telecommunications system comprising a network element and a communications device, the network element comprising
  a receiver for receiving signals representing uplink data from the communications device via f a wireless access interface having a logical baseband frame structure,
  a transmitter for transmitting signals representing downlink data to the communications device via the wireless access interface, the logical baseband frame structure being formed from one or more minimum frequency units and one or more time units to form communications resources for allocation by the network element to the communications device, and
  a controller for controlling the transmitter and the receiver to transmit and to receive signals representing the data to and from the communications device using the wireless access interface, and the communications device comprises
  a receiver for receiving signals representing downlink data from the network element via the wireless access interface,
  a transmitter for transmitting signals representing uplink data to the network element via the wireless access interface, and
  a controller for controlling the transmitter and the receiver to transmit and to receive signals representing the data to and from the network element using the wireless access interface, wherein the controller is configured in combination with the transmitter and the receiver wherein the controller, transmitter and receiver of the network element are is configured in combination
    to determine one or more available frequency resources within a host frequency band,
    to combine the one or more available frequency resources of the host frequency band in time and/or frequency to form communications resources corresponding the one or more of the minimum frequency units to form the logical baseband frame structure, and
    to transmit or to receive the signals representing the data to or from the communications device using the communications resources provided by the one or more minimum frequency units formed within the host frequency band, and
  the controller, the receiver and the transmitter of the communications device are configured in combination
    to receive an indication of one or more frequency resources within a host frequency band, and
    to transmit or to receive the signals representing the data to or from the network element using the communications resources provided by the one or more minimum frequency units formed within the host frequency band.

22. A method for communicating data to and from a communications device, the method comprising
  receiving signals representing downlink data from a network element of a wireless telecommunications system via a wireless access interface having a logical baseband frame structure,
  transmitting signals representing uplink data to the network element wireless access interface, the logical baseband frame structure being formed from one or more minimum frequency units and one or more time units to form communications resources for allocation by the network element to the communications device, and controlling the transmitter and the receiver to transmit and to receive signals representing the data to and from the network element using the wireless access interface, wherein the method includes receiving an indication of one or more frequency resources within a host frequency band, combining the one or more frequency resources of the host frequency band in time and/or frequency to form communications resources corresponding the one or more of the minimum frequency units to form the logical baseband frame structure, and transmitting or receiving the signals representing the data to or from the network element using the communications resources provided by the one or more minimum frequency units formed within the host frequency band.

23. A method for communicating data to and from a communications device, the method comprising, receiving signals representing uplink data from a communications device via a wireless access having a logical baseband frame structure, transmitting signals representing downlink data to the communications device via the wireless access interface, the logical baseband frame structure being formed from one or more minimum frequency units and one or more time units to form communications resources for allocation by the network element to the communications device, and controlling the transmitter and the receiver to transmit and to receive signals representing the data to and from the communications device using the wireless access interface, wherein the method includes determining one or more available frequency resources within a host frequency band, combining the one or more available frequency resources of the host frequency band in time and/or frequency to form communications resources corresponding the one or more of the minimum frequency units to form the logical baseband frame structure, and transmitting or receiving the signals representing the data to or from the communications device using the communications resources provided by the one or more minimum frequency units formed within the host frequency band.

According to another example of the present disclosure there is provided a communications device for communicating data, the communications device comprising a receiver for receiving signals representing downlink data from a network element of a wireless telecommunications system via a downlink channel of a wireless access interface within a host frequency band; and a transmitter for transmitting signals representing uplink data to the network element via an uplink channel of the wireless access interface, the downlink and uplink channels being provided within the same or different frequencies of the host frequency band and the downlink channel and the uplink channel being divided in frequency into one or more minimum frequency units and in time into time units to form communications resources for allocation by the network element to the communications device, each of the one or more minimum frequency units comprising a predetermined number of subcarriers for carrying the signals representing the data via the uplink channel or the downlink channel. The communications device also comprises a controller for controlling the transmitter and the receiver to transmit and to receive signals representing the data to and from the network element using the wireless access interface. The controller is configured in combination with the transmitter and the receiver to receive an indication of frequency resources within a second frequency band comprising one or more sub-carriers, wherein the one or more sub-carriers can be combined in time and/or frequency to form communications resources corresponding one or more of the minimum frequency units, and to transmit or to receive the signals representing the data to or from the network element using the communications resources provided by the one or more minimum frequency units formed within the second frequency band.

According to a second example of the present disclosure the one or more sub-carriers of the communications resources provided by the one or more minimum frequency units formed within the second frequency band are non-contiguous in frequency.

Various further aspects and features of the present invention are defined in the appended claims and various combinations of the features of the dependent claims may be made with those of the independent claims other than the specific combinations recited for the claim dependency. Modifications may also be made to the embodiments hereinbefore described without departing from the scope of the present invention. For instance, although a feature may appear to be described in connection with particular embodiments, one skilled in the art would recognise that various features of the described embodiments may be combined in accordance with the disclosure.

REFERENCES

[1] LTE for UMTS: OFDMA and SC-FDMA Based Radio Access, Harris Holma and Antti Toskala, Wiley 2009, ISBN 978-0-470-99401-6.

The invention claimed is:

1. A communications device for communicating data, the communications device comprising:
a receiver for receiving downlink signals from a network element of a wireless telecommunications system via a wireless access interface having a logical baseband frame structure;
a transmitter for transmitting uplink signals to the network element via the wireless access interface, the logical baseband frame structure being formed from minimum frequency units and time units to form communications resources for allocation by the network element to the communications device; and
a controller for controlling the transmitter to transmit the uplink signals and the receiver to receive the downlink signals to and from the network element using the wireless access interface, wherein
the controller, in combination with the transmitter and the receiver, is configured to:
receive an indication of frequency resource units which are unoccupied within a host frequency band, wherein the host frequency band is configured for use in a radio access technology that is different from a radio access technology of the wireless telecommunications system,
combine the unoccupied frequency resource units within the host frequency band in time and/or frequency to form the minimum frequency units of the logical baseband frame structure, and
transmit the uplink signals or receive the downlink signals to or from the network element using the communications resources provided by the minimum frequency units formed within the host frequency band, wherein
the frequency resource units which are unoccupied within the host frequency band are non-contiguous in frequency, exclusively allocated for use by one of the minimum frequency units of the logical baseband frame structure, and combined for a single time unit to form the communications resources corresponding to the minimum frequency units.

2. The communications device as claimed in claim 1, wherein
the host frequency band includes one or more unoccupied global system for mobile communications (GSM) channels and each of the unoccupied frequency resource units of the host band are positioned in a one of the unoccupied GSM channels.

3. The communications device as claimed in claim 1, wherein
the uplink signals are transmitted and received in accordance with signal carrier frequency divisional multiple access (SC-FDMA).

4. The communications device as claimed in claim 1, wherein
the downlink signals are transmitted and received in accordance with orthogonal frequency division multiplexing (OFDM).

5. The communications device as claimed in claim 1, wherein
the minimum frequency units are formed from a predetermined number of subcarriers and one or more of the subcarriers within the host frequency band are non-contiguous.

6. The communications device as claimed in claim 1, wherein
the controller is configured in combination with the receiver to receive an indication from the network element of the minimum frequency units formed within the host frequency band.

7. The communications device as claimed in claim 1, wherein the controller is configured in combination with the receiver and the transmitter to also receive and transmit signals representing data using the logical baseband frame structure and frequency resource units of a contiguous frequency band.

8. The communications device as claimed in claim 1, wherein
the frequency resources units are individual global system for mobile communications (GSM) channels, and
the radio access technology of the wireless telecommunications system is defined according to a 3$^{rd}$ Generation Partnership Project (3GPP) standard.

9. The communications device as claimed in claim 8, wherein
the frequency resources include six GSM channels, and the six GSM channels are combined to form one channel defined according to the 3GPP standard.

10. The communications device as claimed in claim 9, wherein
the single time unit is one subframe of the logical baseband frame structure.

11. A network element of a wireless telecommunications system for communicating data to and from a communications device, the network element comprising:
a receiver for receiving downlink signals from the communications device via a wireless access interface having a logical baseband structure;
a transmitter for transmitting uplink signals to the communications device via the wireless access interface, the logical baseband frame structure being formed from minimum frequency units and time units to form communications resources for allocation by the network element to the communications device; and
a controller for controlling the transmitter to transmit the uplink signals and the receiver to receive the downlink signals to and from the communications device using the wireless access interface, wherein
the controller, in combination with the transmitter and the receiver, is configured to:
determine frequency resource units which are unoccupied within a host frequency band, wherein the host frequency band is configured for use in a radio access technology that is different from a radio access technology of the wireless telecommunications system,
combine the unoccupied frequency resource units of the host frequency band in time and/or frequency to form communications resources corresponding to the minimum frequency units providing the logical baseband frame structure, and
transmit the uplink signals or receive the downlink signals to or from the communications device using the communications resources provided by the minimum frequency units formed within the host frequency band, wherein
the frequency resource units which are unoccupied within the host frequency band are non-contiguous in frequency, exclusively allocated for use by one of the minimum frequency units of the logical baseband frame structure, and combined for a single time unit to form the communications resources corresponding to the minimum frequency units.

12. The network element as claimed in claim 11, wherein
the host frequency band includes one or more unoccupied global system for mobile communications (GSM) channels and each of the unoccupied frequency resource units of the host frequency band are positioned in a one of the unoccupied GSM channels.

13. The network element as claimed in claim 11, wherein
the uplink signals are transmitted and received in accordance with signal carrier frequency divisional multiple access (SC-FDMA).

14. The network element as claimed in claim 11, wherein
the downlink signals are transmitted and received in accordance with orthogonal frequency division multiplexing (OFDM).

15. The network element as claimed in claim 11, wherein
the minimum frequency units are formed from a predetermined number of subcarriers and one or more of the subcarriers within the host frequency band are non-contiguous.

16. The network element as claimed in claim 11, wherein
the controller is configured in combination with the transmitter to transmit to the communications device an indication from the network element of the minimum frequency units formed within the host frequency band.

17. The network element as claimed in claim 11, wherein the controller is configured in combination with the receiver and the transmitter to
also receive and transmit signals representing data using the logical baseband frame structure and frequency resource units of a contiguous frequency band.

18. A method for communicating data to and from a communications device, the method comprising:

receiving, by a receiver, downlink signals from a network element of a wireless telecommunications system via a wireless access interface having a logical baseband frame structure;

transmitting, by a transmitter, uplink signals to the network element wireless access interface, the logical baseband frame structure being formed from minimum frequency units and time units to form communications resources for allocation by the network element to the communications device; and controlling the transmitter to transmit the uplink signals and controlling the receiver to receive the downlink signals to and from the network element using the wireless access interface, by:

receiving an indication of frequency resource units which are unoccupied within a host frequency band, wherein the host frequency band is configured for use in a radio access technology that is different from a radio access technology of the wireless telecommunications system, combining the unoccupied frequency resource units of the host frequency band in time and/or frequency to form communications resources corresponding to the minimum frequency units providing the logical baseband frame structure, and transmitting the uplink signals or receiving the downlink signals to or from the network element using the communications resources provided by the minimum frequency units formed within the host frequency band, wherein the frequency resource units which are unoccupied within the host frequency band are non-contiguous in frequency, exclusively allocated for use by one of the minimum frequency units of the logical baseband frame structure, and combined for a single time unit to form the communications resources corresponding to the minimum frequency units.

* * * * *